US012055304B2

(12) United States Patent
Dedul et al.

(10) Patent No.: US 12,055,304 B2
(45) Date of Patent: Aug. 6, 2024

(54) INTEGRATED HEAT MANAGEMENT FOR A BUILDING

(71) Applicant: SOWILLO ENERGY LTD, Haifa (IL)

(72) Inventors: Kirill Dedul, Haifa (IL); Gurevich Pavel, Berlin (DE)

( * ) Notice: Subject to any disclaimer, the term of this patent is extended or adjusted under 35 U.S.C. 154(b) by 450 days.

(21) Appl. No.: 16/968,897

(22) PCT Filed: Aug. 6, 2020

(86) PCT No.: PCT/IL2020/050862
§ 371 (c)(1),
(2) Date: Aug. 11, 2020

(87) PCT Pub. No.: WO2021/024261
PCT Pub. Date: Feb. 11, 2021

(65) Prior Publication Data
US 2022/0043412 A1    Feb. 10, 2022

Related U.S. Application Data

(60) Provisional application No. 62/884,166, filed on Aug. 8, 2019.

(51) Int. Cl.
    *F24D 19/10*      (2006.01)
    *F24D 3/00*      (2022.01)
    (Continued)

(52) U.S. Cl.
    CPC ......... *F24D 19/1081* (2013.01); *F24D 3/005* (2013.01); *F24D 3/18* (2013.01);
    (Continued)

(58) Field of Classification Search
    CPC ........ F24D 19/1009; F24D 3/18; F24D 3/005; G06N 5/02; G06Q 50/06; G06Q 50/163; G05B 19/042
See application file for complete search history.

(56) References Cited

U.S. PATENT DOCUMENTS 4,150,787 A * 4/1979 Braathen ............... F24D 17/001
    122/13.3
4,546,818 A * 10/1985 Nussbaum ............ F24D 11/002
    165/47

(Continued)

FOREIGN PATENT DOCUMENTS

CN      101726036 A      6/2010
DE      102010035271 A1      3/2012

(Continued)

OTHER PUBLICATIONS

Lanbin Liu et al. "Application of an exhaust heat recovery system for domestic hot water", 2010, Energy 35 1476-1481.*

*Primary Examiner* — Vincent H Tran

(57) ABSTRACT

An aspect of some embodiments of the current invention relates to an integrated system for heat distribution among a plurality of users. In some embodiments, the system includes a separate automatic control of heat distribution to each user and/or separate billing to each user. For example, a system may supply hot fluid to a plurality of apartments in a building and/or in multiple buildings. Optionally, each apartment has separate remote controlled valves controlling flow of heated fluid to the apartment and/or a sensor sensing how much heat enters and leaves the apartment in the hot fluid. In some embodiments, a processor controls the valve and/or receives data from sensors. The processor optionally controls devices that generate and/or store and/or dissipate heat. Optionally the processor predicts energy availability, costs and needs controls valves and/or devices to provide for predicted and/or unexpected needs while reduce cost of the energy.

19 Claims, 15 Drawing Sheets

(51) Int. Cl.
*F24D 3/18* (2006.01)
*G05B 19/042* (2006.01)
*G06N 5/02* (2023.01)
*G06Q 10/0631* (2023.01)
*G06Q 50/06* (2012.01)
*G06Q 50/163* (2024.01)
*G06Q 30/018* (2023.01)
*G06Q 50/00* (2012.01)

(52) U.S. Cl.
CPC ..... *F24D 19/1009* (2013.01); *F24D 19/1078* (2013.01); *G05B 19/042* (2013.01); *G06N 5/02* (2013.01); *G06Q 10/06315* (2013.01); *G06Q 50/06* (2013.01); *G06Q 50/163* (2013.01); *G05B 2219/49023* (2013.01); *G06Q 30/018* (2013.01); *G06Q 50/01* (2013.01)

(56) References Cited

U.S. PATENT DOCUMENTS

| | | | |
|---|---|---|---|
| 2006/0004587 A1* | 1/2006 | Willbanks, Jr. | F24D 19/1063 705/413 |
| 2007/0170270 A1* | 7/2007 | Jelinek | F24D 17/001 236/12.11 |
| 2008/0029046 A1* | 2/2008 | Welles | F24D 17/0005 122/13.01 |
| 2009/0277203 A1 | 11/2009 | Dupraz | |
| 2010/0139579 A1* | 6/2010 | Su | F24D 17/0005 122/367.1 |
| 2010/0319684 A1* | 12/2010 | Almogy | F24D 19/1042 126/714 |
| 2011/0024080 A1* | 2/2011 | Bose | F28F 9/02 165/71 |
| 2012/0054123 A1* | 3/2012 | Broniak | G06Q 50/06 702/45 |
| 2012/0125373 A1* | 5/2012 | Grull | A47L 15/4217 134/94.1 |
| 2015/0345805 A1* | 12/2015 | Butler | G06Q 50/06 700/300 |
| 2016/0161130 A1 | 6/2016 | Franck | |
| 2017/0108236 A1* | 4/2017 | Guan | G05B 19/042 |
| 2017/0285596 A1* | 10/2017 | Hunt | G05B 19/042 |
| 2017/0306798 A1* | 10/2017 | Cave | F01K 7/16 |
| 2018/0181150 A1* | 6/2018 | Zuluaga | F24D 19/1003 |
| 2020/0224394 A1* | 7/2020 | Mariano | E03B 7/075 |
| 2020/0340663 A1* | 10/2020 | Fotinos | F24D 17/02 |

FOREIGN PATENT DOCUMENTS

| | | |
|---|---|---|
| EP | 0085774 A1 | 8/1983 |
| JP | 2015132461 A | 7/2015 |
| JP | 2019020023 A * | 2/2019 |
| KR | 101168538 B1 | 7/2012 |

* cited by examiner

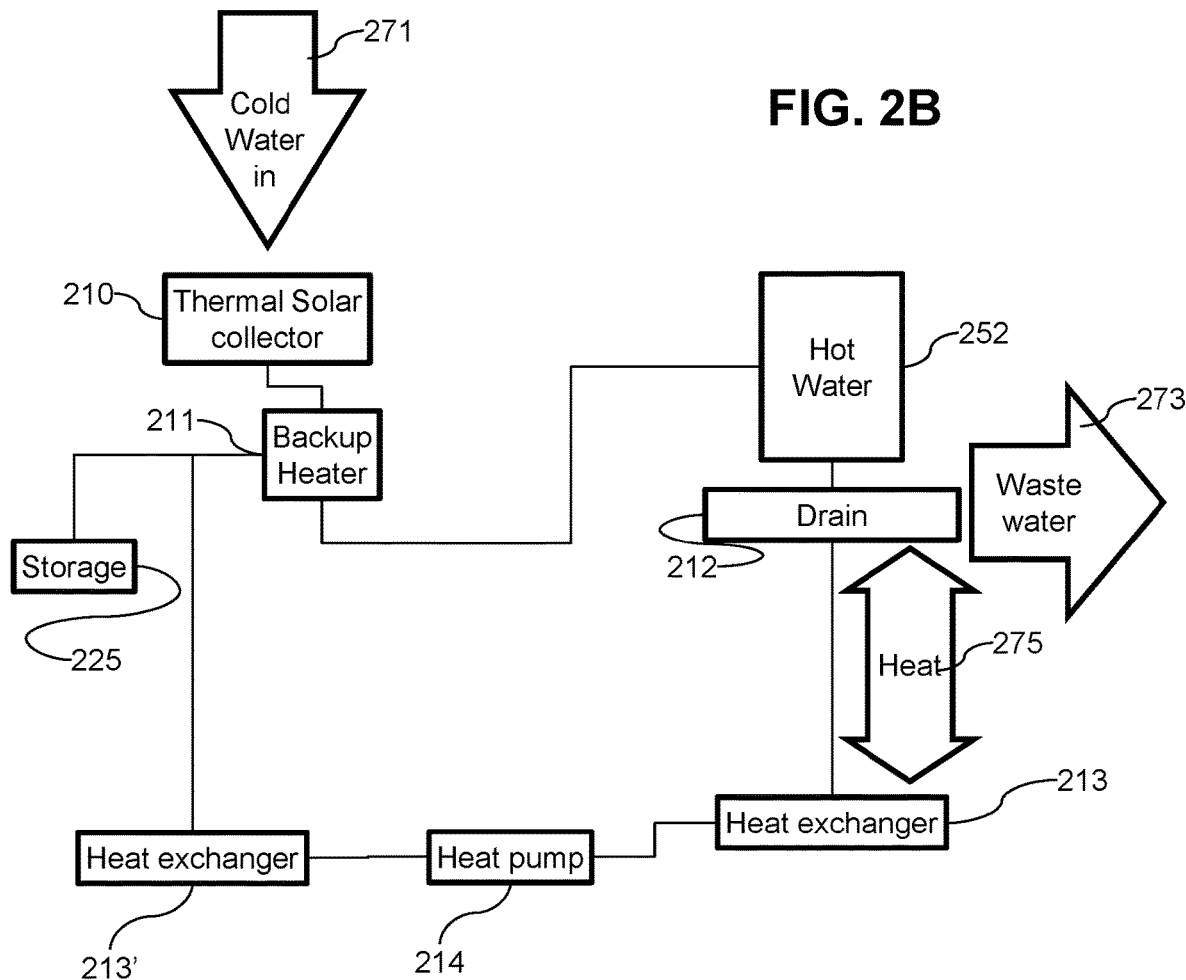
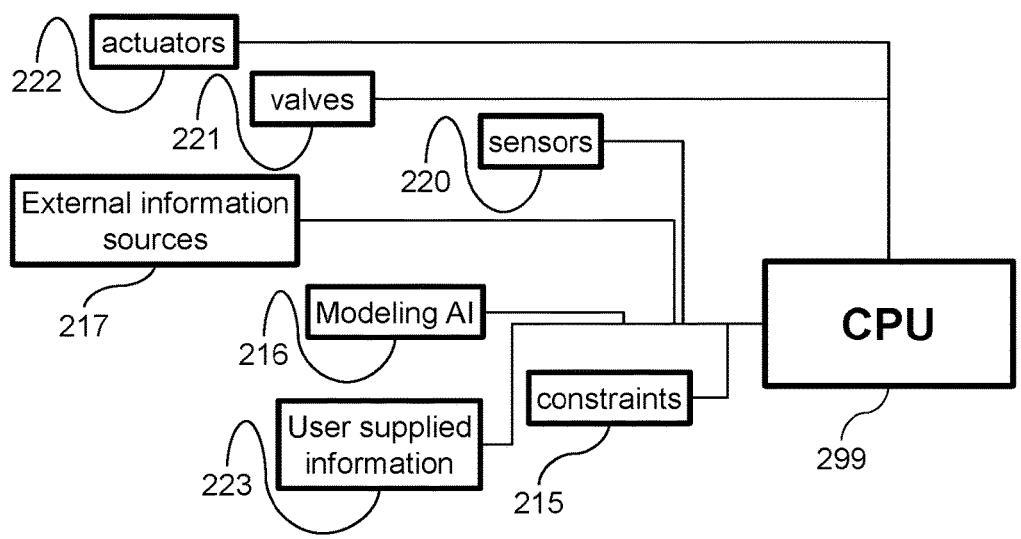
FIG. 2B

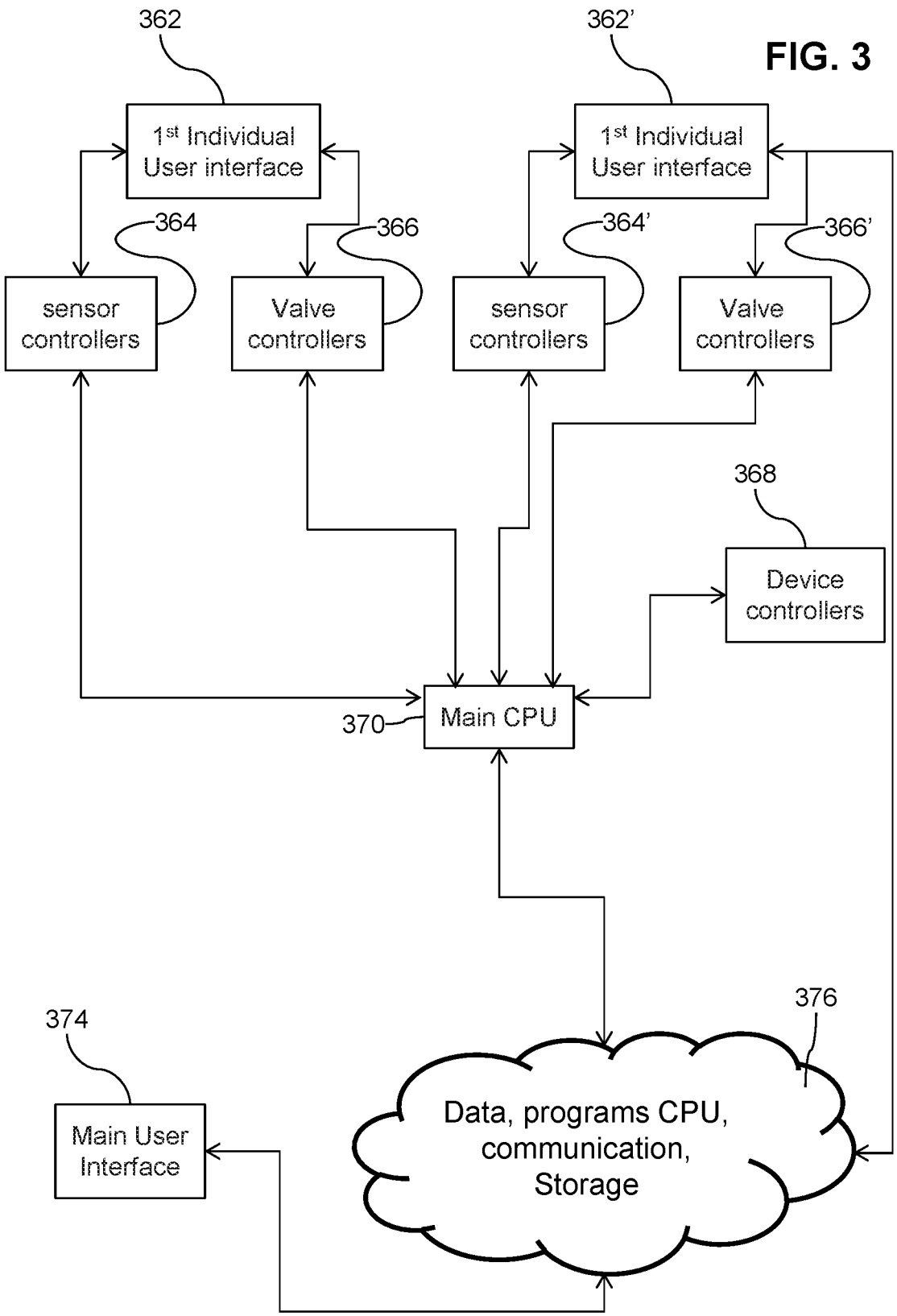

INTEGRATED HEAT MANAGEMENT FOR A BUILDING

RELATED APPLICATION/S

This application claims the benefit of priority under 35 USC § 119(e) of U.S. Provisional Patent Application No. 62/615,012 filed 9 Jan. 2018, the contents of which are incorporated herein by reference in their entirety.

FIELD AND BACKGROUND OF THE INVENTION

According to the article ICAE2013-189 PROOF OF CONCEPT: LARGE-SCALE MONITOR AND CONTROL OF HOUSEHOLD WATER HEATING IN NEAR REAL-TIME by Booysen et al. published in International Conference on Applied Energy ICAE 2013, Jul. 1-4, 2013, Pretoria, South Africa Paper ID: ICAE2013-189 "Two fundamental challenges for efficient energy management are the lack of timely demand and consumption information at the distribution level, and inability to responsively control supply at that level. With recent advances made in wireless communications and machine-to-machine (M2M) networking, a plethora of new solutions have been proposed for smart-grid and home automation. The many approaches, however, focus on the communications and technological domains of these solutions. In this paper we present the design and results of a proof-of-concept project, in which 18 homes were equipped to remotely monitor and control hot water cylinders in real time. The system makes use of the SMART platform to collect and collate telemetry data, and to deliver commands through the use of a cellular network. Users can set the on-off times of their water heating, and also monitor the consumption on a daily basis, in energy or monetary units. The data is centrally processed to provide useful information to the utility, such as the expected total demand for the system in 15-minute intervals, detected leaks, sudden drops in pressure, anode depletion, and to control each cylinder individually."

The present invention, in some embodiments thereof, relates to a system and method for managing heat in a building and, more particularly, but not exclusively, to an integrated for building scale heat management and apartment scale distribution in a multi-dwelling building.

Additional background art includes Japanese patent no. JP6367104, German patent application DE102010035271, US Patent application no. 20160161130, European Patent no. EP0085774, Korean Patent no. KR101168538, Chinese patent application no. CN101726036 and U.S. Pat. No. 8,099,972.

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided a heat sharing system including: a renewable heat collector heating a fluid; a plurality of usage zones; a reservoir for the fluid; a plurality of remote-controlled valves allowing individual control of flow between the reservoir and each zone and the collector; and a processor controlling the plurality of valves.

According to some embodiments of the invention, the system further includes: a plurality of local controllers, each of the plurality of local controller controlling a plurality of respective sensors and actuators; each of the local controllers in communication with the processor.

According to some embodiments of the invention, each local controller is hard wired to the plurality of sensors and actuators and wherein the central controller does not communicate directly with the plurality of sensors and actuators.

According to some embodiments of the invention, the central controller sends a respective time dependent goal function to each of the plurality of local controllers and each of the local controllers controls the respective plurality of sensors and actuators in accordance to the respective goal function.

According to some embodiments of the invention, the renewable heat collector includes a solar thermal collector.

According to some embodiments of the invention, the solar thermal collector includes multiple units and wherein the plurality of valves are arranged to allow the processor to switch a connection between the multiple units and the reservoir between series and parallel connections.

According to some embodiments of the invention, the renewable heat collector includes a heat pump.

According to some embodiments of the invention, the renewable heat collector includes a heat exchanger in contact with waste water under control of the processor. According to some embodiments of the invention, the renewable heat collector includes a heat pump under control of the processor; the heat pump connected between the reservoir and the heat exchanger for transferring heat between the waste water and the reservoir.

According to some embodiments of the invention, the plurality of valves are arranged to allow the processor to reverse a direction of heat flow between at least one of the zones and the reservoir.

According to some embodiments of the invention, the plurality of valves are arranged to allow the processor to control heat flow between at least one of the zones and at least one other of the zones.

According to some embodiments of the invention, the system further includes: a heat flow sensor positioned to measure heat flow between the reservoir and at least one of the zones.

According to some embodiments of the invention, the system further includes: a plurality of heat flow sensors positioned to measure heat flow between the reservoir and each of the zones.

According to some embodiments of the invention, the system further includes: a plurality of heat sensors positioned to measure a temperature in each zone.

According to some embodiments of the invention, a respective user is billed for heat delivered to the each zone.

According to some embodiments of the invention, a billing rate for heat delivered to the each zone changes according to a time when the heat was delivered. According to some embodiments of the invention, at least one of the zones is limited to a single dwelling of a multiple dwelling building.

According to some embodiments of the invention, the processor is configured to deliver fluid to at least one of the zones at a temperature that is less than fluid delivered to another of the zones.

According to some embodiments of the invention, the processor is configured to deliver fluid at a first temperature during one time period and at a different temperature at a different time period.

According to some embodiments of the invention, the processor is configured for predicting future usage and time dependent energy input.

According to some embodiments of the invention, the processor is configured to change a quantity of heat stored in the reservoir in response to a predicted need.

According to some embodiments of the invention, the processor is configured to predict future usage and change a quantity of heat stored in a least one of the zones in response to a predicted need.

According to some embodiments of the invention, the system further includes: a sensor for determining a location of an occupant and wherein the processor receives output from the sensor and wherein the predicting accounts for the output.

According to some embodiments of the invention, the sensor includes at least one of a GPS sensor, an electrical use sensor, a microphone and a component of a burglar alarm.

According to some embodiments of the invention, the system further includes an active heat source under control of the processor and wherein the processor is configured to activate the active heat source in accordance with a predicted future need.

According to some embodiments of the invention, the system further includes a user interface and wherein the user interface is configured to supply data to the processor to improve a prediction of future use.

According to some embodiments of the invention, the user interface is supplied to an owner of at least one of the zones.

According to some embodiments of the invention, the processor is programmed for tracking heat use and predicted heat use and to improve prediction based on the tracking.

According to some embodiments of the invention, the processor is connected to an external data source for automatic updating of information for the predicting.

According to some embodiments of the invention, the information includes a weather prediction.

According to some embodiments of the invention, the processor is configure to increase a loss of heat to an environment in response to a predicted oversupply of heat.

According to some embodiments of the invention, the processor is configured for assessing a condition of the system.

According to some embodiments of the invention, the assessing includes measuring heat losses over time.

According to some embodiments of the invention, the assessing includes measuring changes heat losses over time.

According to some embodiments of the invention, the assessing includes determining a state of an insulation.

According to some embodiments of the invention, the assessing includes detecting an improper use of the system.

According to some embodiments of the invention, the system further includes wherein the processor is further configured to collect statistics on equipment performance.

According to some embodiments of the invention, the system further includes wherein the processor is further configured to recommend improvement in at least one of system hardware and system use.

According to some embodiments of the invention, the system further includes a vibration sensor configured to detect at least one of opening a valve, closing a valve, air bubble in a pipe, problems in a pump, problems in a compressor and presence of limescale.

According to an aspect of some embodiments of the invention, there is provided a method of managing heat including: predicting a future heat supply and heat demand; collecting heat with a renewable source; distributing heat to users to fill a real demand including controlling a plurality of automatic valves to adjust distribution between a plurality of usage zones to increase efficiency.

According to some embodiments of the invention, the efficiency includes at least one of increasing a ratio of use of renewable resources with respect to non-renewable resources, reduce grid load and reduce cost.

According to some embodiments of the invention, the method further includes: collecting data on the position of a user and adjusting at least one of the controlling and/or predicting according to the position.

According to some embodiments of the invention, the method further includes: collecting data on the performance of a distribution and sending a recommendation to improve system performance.

According to some embodiments of the invention, the method further includes: providing an incentive to a user who receives marginal benefit from the method.

According to an aspect of some embodiments of the invention, there is provided a system for active heat recovery including: a heat pump; an array of at least one heat exchanger receiving waste heat; an output flow from the array directed to a heat a cold cycle of the heat pump; a heat harvesting system for using heat from a hot cycle of the heat pump.

According to some embodiments of the invention, the waste heat includes warm waste water from a building.

According to some embodiments of the invention, the heat harvesting system outputs hot water to the building.

According to some embodiments of the invention, the waste heat includes overheated fluid from a solar thermal system.

According to some embodiments of the invention, the waste heat is transferred to a wastewater flow.

According to some embodiments of the invention, there are at least two walls between input fluid containing the waste heat and a hot output flow from the heat harvesting system.

According to an aspect of some embodiments of the invention, there is provided a method of recovering heat including: feeding a warm waste flow into a heat exchanger array; directing heat from the heat exchanger array to a cold cycle of a heat pump; heating water for domestic use with a hot cycle of the heat pump.

According to some embodiments of the invention, the heat directed from the heat exchange array to the cold cycle of the heat pump includes heated fluid.

According to some embodiments of the invention, the warm waste flow includes waste water from a building wherein the directing is to a hot water system of the building.

According to an aspect of some embodiments of the present invention there is provided a shared multi-user residential solar water heating system for N users with at least N heat storage units, with ability to dynamically change heat path(s) and/or disconnect/bypass/isolate/re-route parts of the system at run-time. The system includes pipes, pumps, and at least one controller monitoring the system and making heat routing decisions, and a plurality of sensors (which might be wireless or wired) operationally coupled to the system, including but not limited to N temperature sensors, N flow sensors and at least one backup heater. Configuration change may be done as a response to changing conditions or to anticipate predicted events.

According to some embodiments of the invention, heat storages are merged into one containment.

According to some embodiments of the invention, sensors whose measurements are close and/or deducible from other sensors values are replaced with fewer sensors.

According to some embodiments of the invention, the system includes a switch module where a part of flow meters and temperature sensors come as a heat meter.

According to some embodiments of the invention, additional sensors which might not be directly used for system operation are installed, including but not limited to air quality sensors, noise sensors, humidity sensors, insolation sensors, smoke detectors, motion detectors, presence sensors and others.

According to some embodiments of the invention, sensors might share embodiment and/or controlling electronics and/or power source.

According to some embodiments of the invention, the system is connected to a cloud and/or a remote-control center.

According to some embodiments of the invention, software is able to predict heat production or get it from remote.

According to some embodiments of the invention, software is able to predict heat consumption patterns and amounts per user or per system part via either local or remote learning system.

According to some embodiments of the invention, prediction is done for a group of users instead and/or an individual.

According to some embodiments of the invention, a user can specify and/or correct and/or limit his expected consumption, e.g. via the Internet and/or dedicated application.

According to some embodiments of the invention, the system can prepare hot water based on predicted or supplied usage patterns before each usage to reduce hot water waiting time and/or cold-water waste while reducing heat losses when hot water is not required.

According to some embodiments of the invention, a user can specify minimum temperature of inlet hot water.

According to some embodiments of the invention, the system uses explicit or implicit human presence sensors (motion detection, mobile/wearable device tracking, push button, infrared sensors or other that can serve this purpose) near the source of hot water and can heuristically decide to prepare hot water at the nearest or most probable hot water exit in response to this event.

According to some embodiments of the invention, hot water is withheld until it reaches the specified minimum temperature to reduce cold water waste or for other purpose.

According to some embodiments of the invention, the controller is able to monitor system and/or individual device performance and detect anomalies and/or collect statistics.

According to some embodiments of the invention, usage and/or performance statistics and/or raw or processed sensor data are stored in the cloud.

According to some embodiments of the invention, the system performs thermodynamic simulation of its parts or system as a whole, including but not limited flow simulation, heat loss simulation and individual device models.

According to some embodiments of the invention, the system learns actual device and/or subsystem performance and/or heat flow and distribution.

According to some embodiments of the invention, the system detects individual device degradation or future faults.

According to some embodiments of the invention, the system detects subsystem degradation or future faults.

According to some embodiments of the invention, the system alerts interested/subscribed parties and/or control center about the problem.

According to some embodiments of the invention, the system combines thermodynamic simulation and learning to derive accurate device and/or subsystem performance and/or heat flow and distribution.

According to some embodiments of the invention, the system optimizes heat routing subject to user preferences (cost and/or temperature accuracy and/or backup heating usage and/or device wear). The system can take in account weather forecast, predicted or specified consumption, user budget, heat distribution and losses, detected anomalies and/or malfunctions, device profiles, backup heating cost under at given time under given weather conditions such as but not limited to varying cost of electricity.

According to some embodiments of the invention, optimization takes in account device CoP under given weather conditions and/or preferred modes of operation of the equipment.

According to some embodiments of the invention, the system the heat storage units includes long-term storage units.

According to some embodiments of the invention, the system detects leakages in the building.

According to some embodiments of the invention, the system prevents leakages upon detection.

According to some embodiments of the invention, the system detects leakages in a heat exchanger and/or pipes and/or pipe interconnections.

According to some embodiments of the invention, the system detects leakages in one or more apartments.

According to some embodiments of the invention, the system detects leakages in a heat exchanger and/or in one or more storage units.

According to some embodiments of the invention, the system prevents leakages upon detection.

According to some embodiments of the invention, the system includes an integrated billing system.

According to some embodiments of the invention, the system includes an integrated energy quota system.

According to some embodiments of the invention, the system includes a dedicated control interface device with a plurality of control buttons and/or display for system monitoring.

According to some embodiments of the invention, the system schedules hot water supply and quotas according to user instructions supplied in advance via a browser and/or app, a messenger (including but not limited to WhatsApp, Telegram, Messenger), and/or SMS and/or a dedicated controller.

According to some embodiments of the invention, the system is remotely controlled by operator from a remote-control center.

According to some embodiments of the invention, detect malfunction/anomaly triggers alert to the relevant/subscribed parties.

According to some embodiments of the invention, the system operates with failed subsystems, which can be safely disabled.

According to some embodiments of the invention, the system functions without installed or with malfunctioning solar subsystem.

According to some embodiments of the invention, the system co-operates with any other system composing a bigger system with ability to perform inter- and intrasystem energy exchange, optimization and/or energy selling.

According to some embodiments of the invention, where each cooperating system may have own optimization objectives and priorities and priority of those objectives can be automatically negotiated between the systems.

According to some embodiments of the invention, wherein cooperating systems span over more than one building and can form district energy center.

According to some embodiments of the invention, when cooperating systems connect several district energy centers.

According to some embodiments of the invention, the system prevents servicing and/or installation and/or activation to a technician with a without valid currently active, non-revoked digital certificate or other means of authentication method.

According to some embodiments of the invention, wherein the system sends statistics about malfunctions and/or anomalies and/or servicing actions performed to fix them accompanied with unique identification of servicing personnel involved.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or a mesh network (e.g. ZigBee, BLE Mesh) or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2B illustrates an open loop system in accordance with an embodiment of the current invention;

FIG. 3 is a block diagram illustrating a system for controlling individualized heat supply by a shared system in accordance with an embodiment of the current invention;

Figure 9:
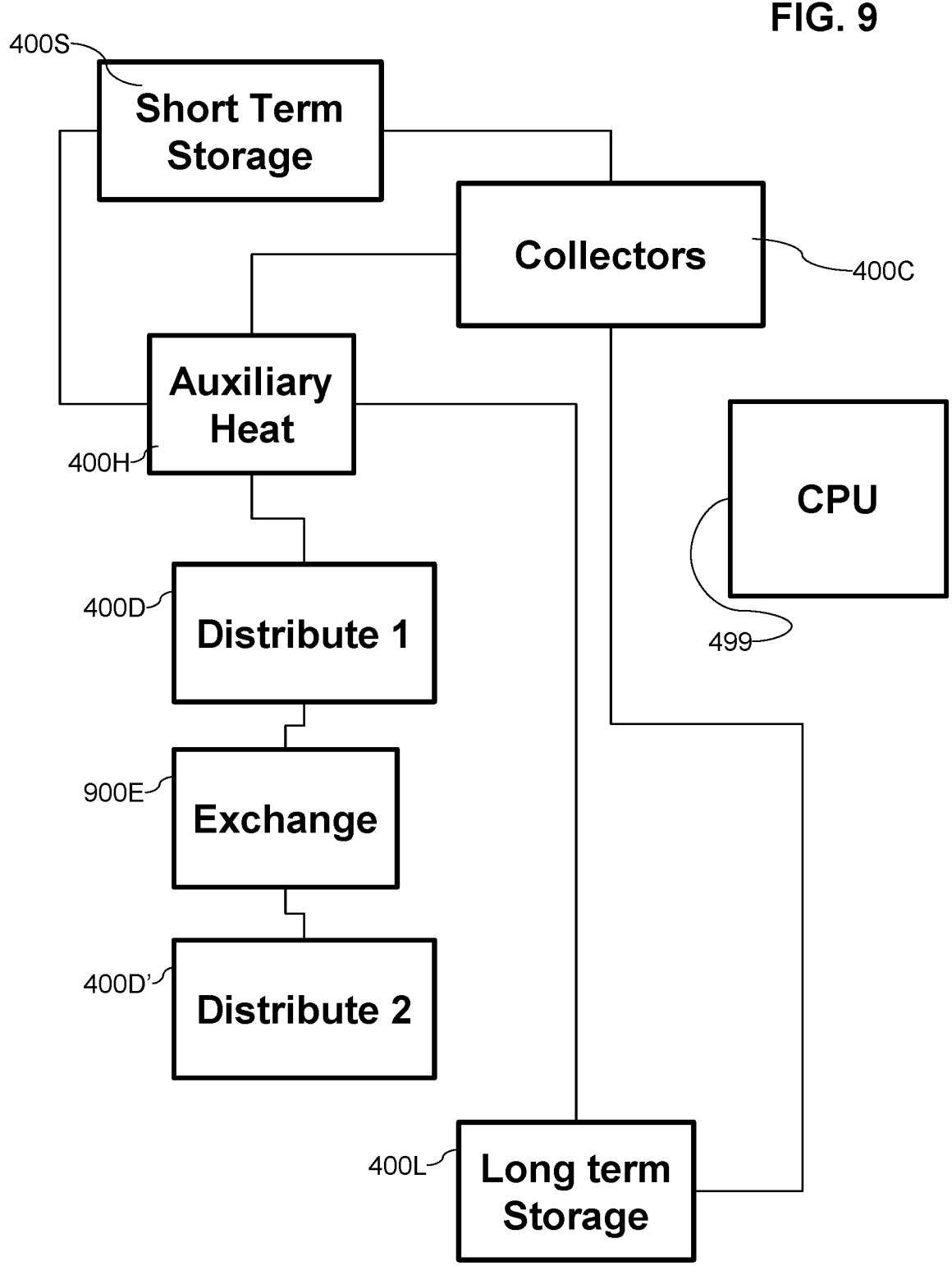
Figure 10:
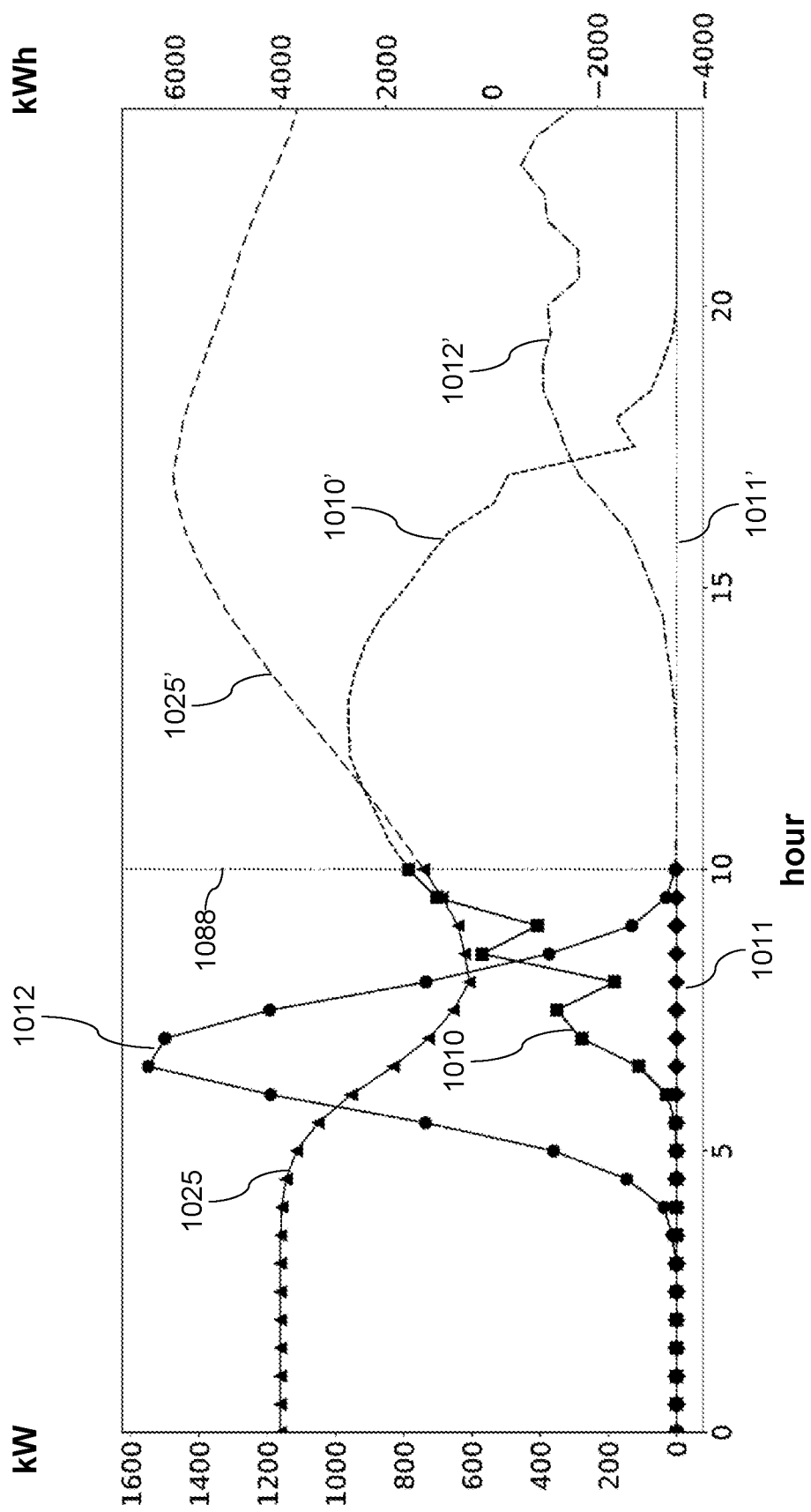
Figure 11:
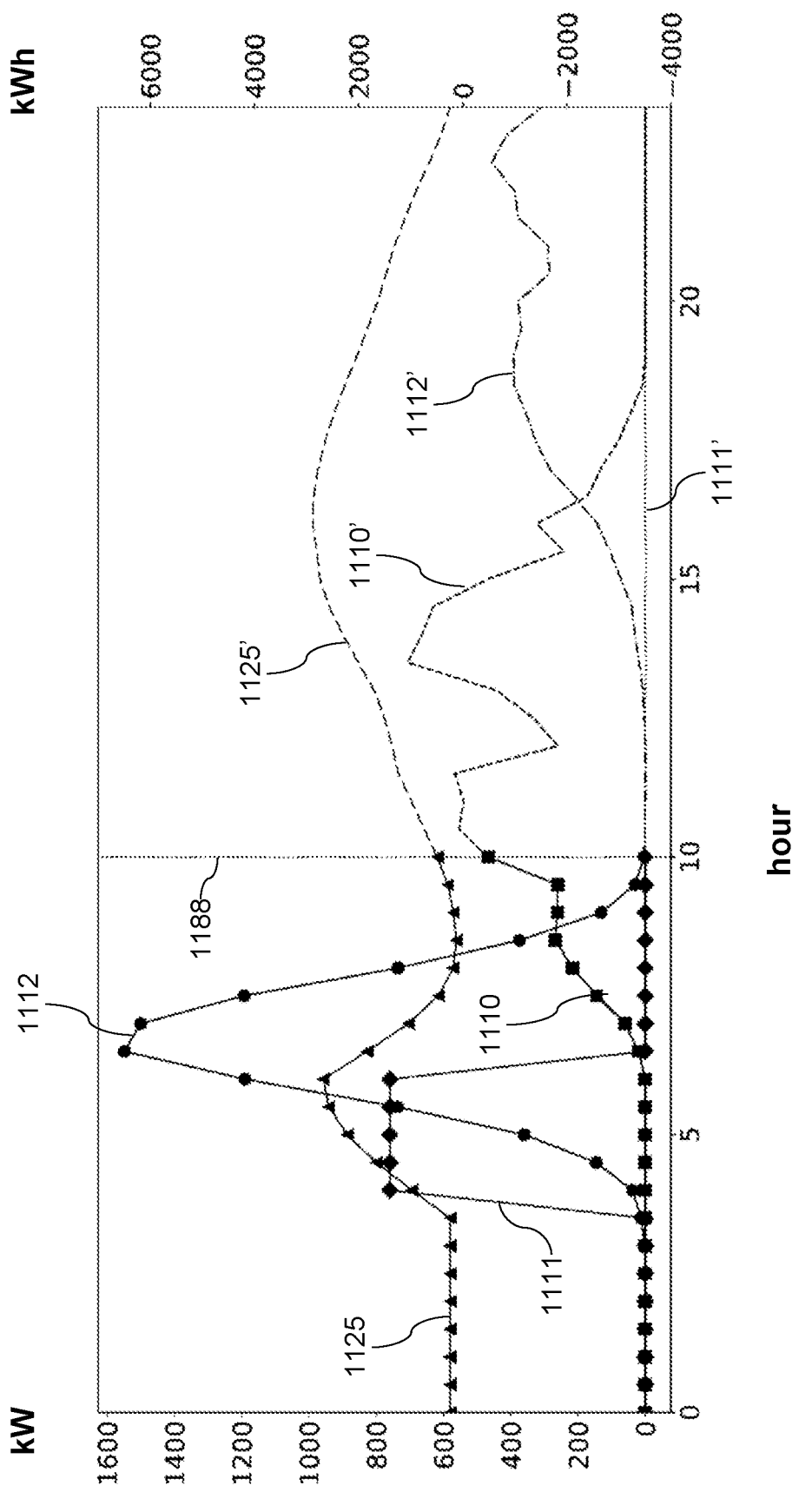
Figure 12:
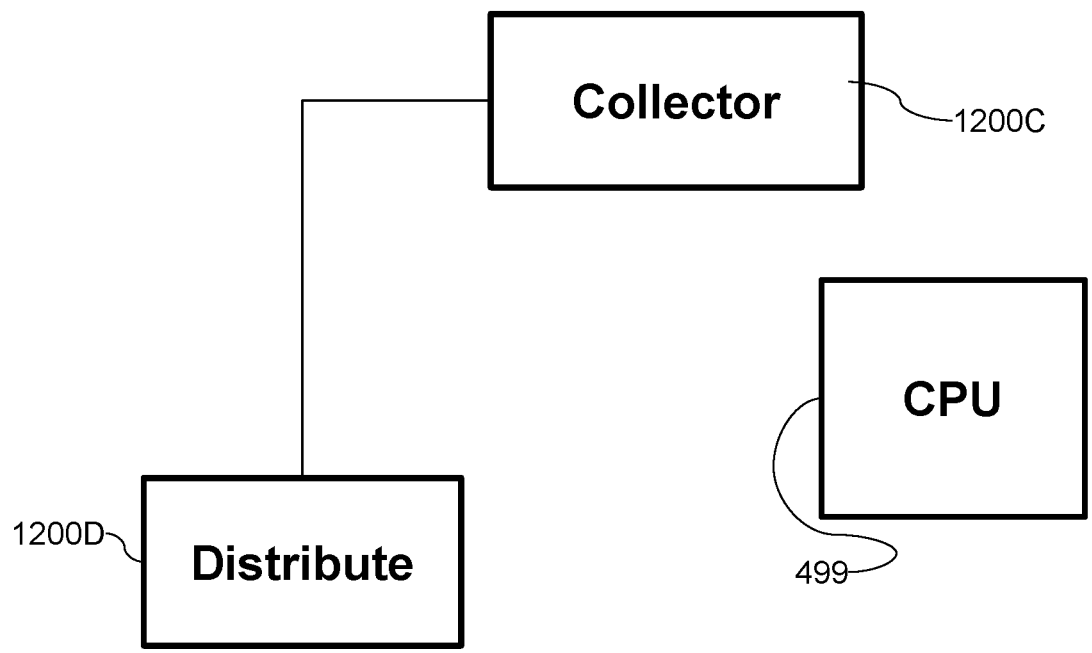
Figure 13:
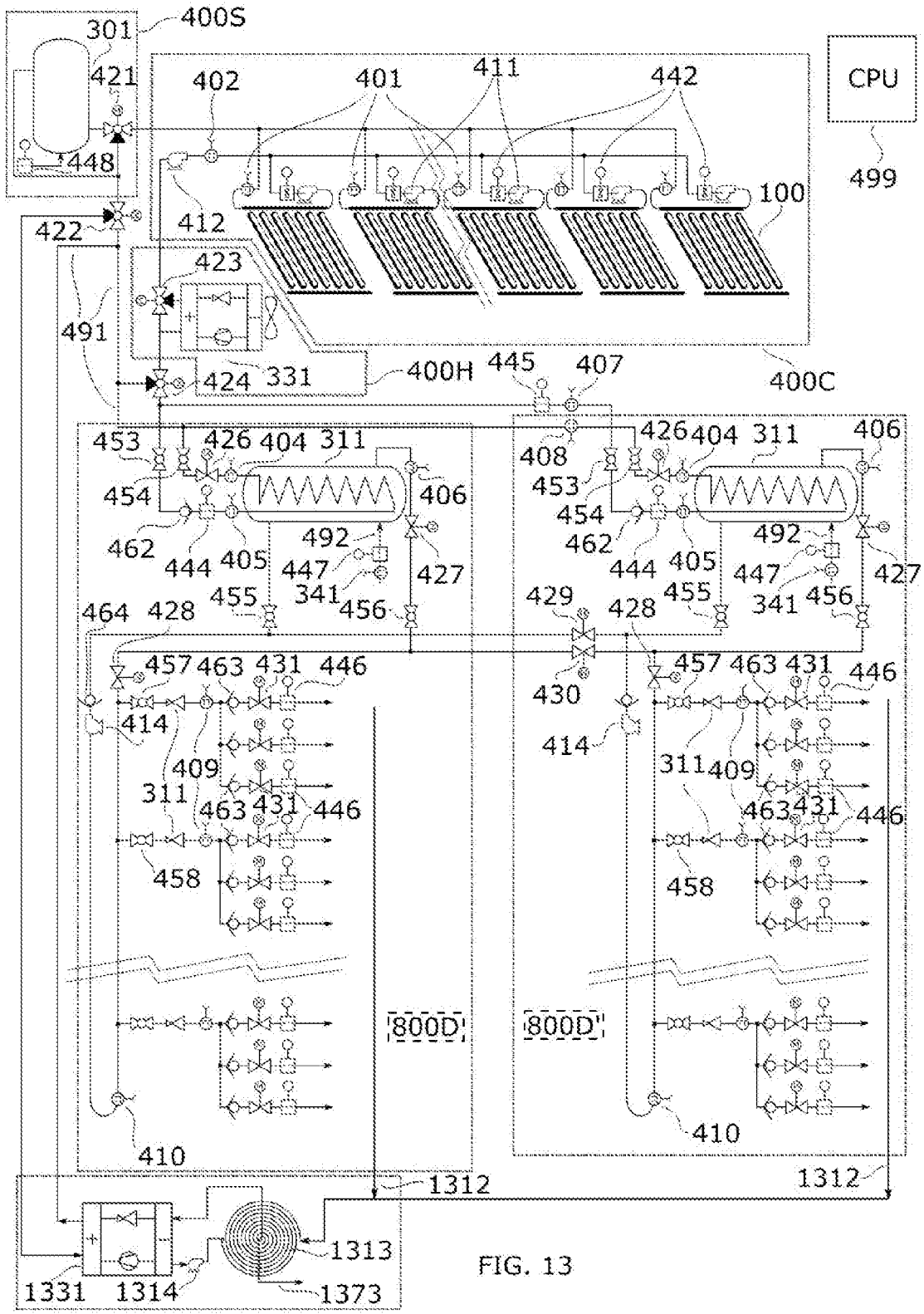
Figure 14:
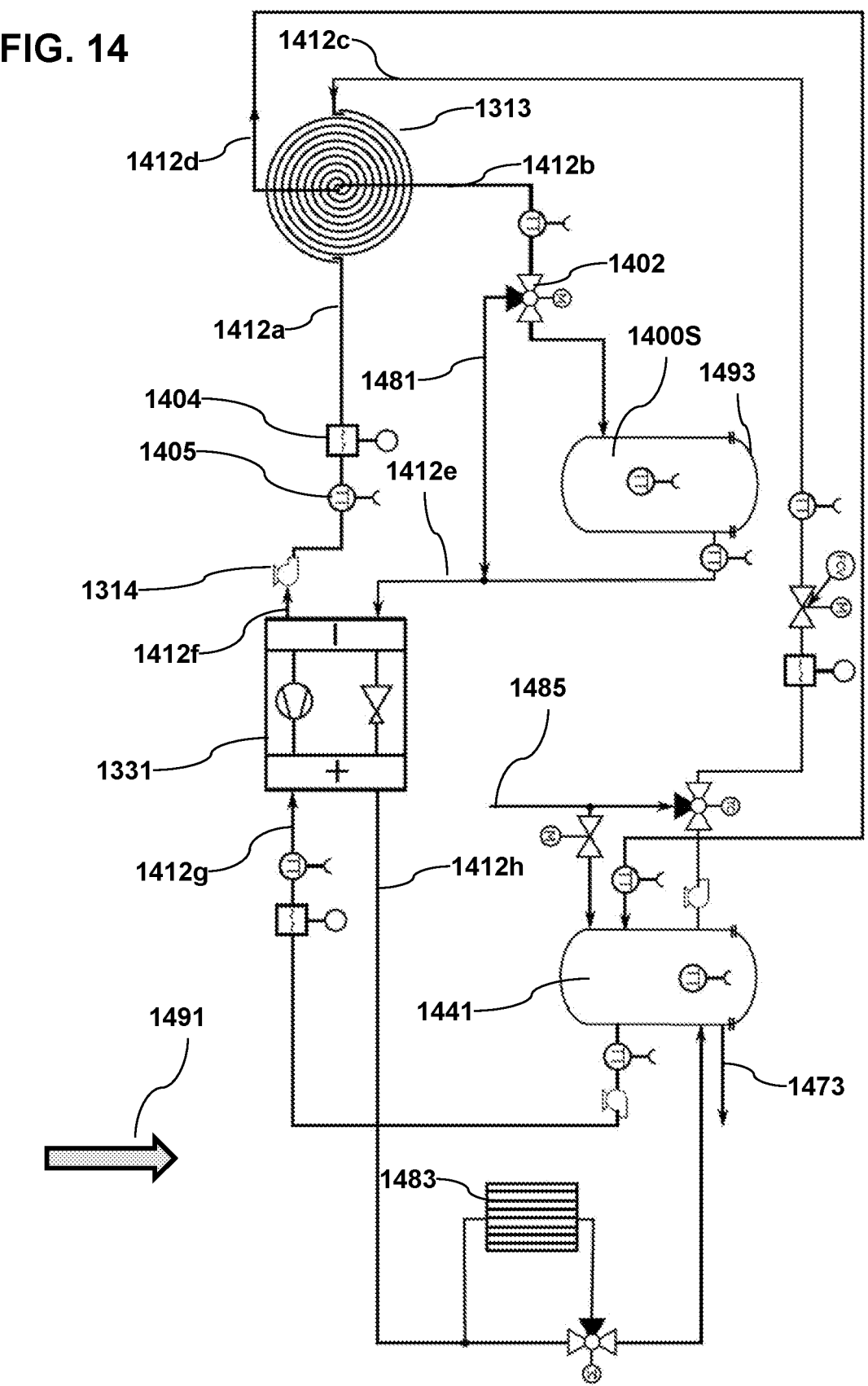

FIG. 9 extends a heat distribution system in accordance with an embodiment of the current invention;

FIG. 10 is a graph of energy balance over time on a sunny day in accordance with an embodiment of the current invention;

FIG. 11 is a graph of energy balance over time on a cloudy day in accordance with an embodiment of the current invention;

FIG. 12 is a block diagram of a system having a computerized collection 1200C and/or distribution 1200D system in accordance with an embodiment of the current invention FIG. 13 illustrates an exemplary system with active heat recovery in accordance with an embodiment of the current invention; and FIG. 14 illustrates and exemplary experimental system in accordance with an embodiment of the current invention.

DESCRIPTION OF SPECIFIC EMBODIMENTS OF THE INVENTION

The present invention, in some embodiments thereof, relates to a system and method for managing heat in a building and, more particularly, but not exclusively, to an integrated for building scale heat management and apartment scale distribution in a multi-dwelling building.

An aspect of some embodiments of the current invention relates to an integrated system for heat distribution among a plurality of users. In some embodiments, the system includes a separate automatic control of heat distribution to each user and/or separate billing to each user. For example, a system may supply hot fluid to a plurality of apartments in a building and/or in multiple buildings. Optionally, each apartment has a separate remote-controlled valve controlling flow of heated fluid to the apartment and/or a sensor sensing how much heat enters and leaves the apartment in the hot fluid. In some embodiments, a processor controls the valve and/or receives data from sensors. The processor optionally controls devices that generate and/or store and/or dissipate heat. For example, there may be a renewable heat collector (for example a solar thermal collector, a heat exchanger in contact with waste water) and/or an active heat source (for example a heat pump and/or a heater) and/or a heat storage reservoir (for example an underground heated volume and/or a heated concrete block and/or tanks for storing hot fluid). Optionally the processor predicts energy availability, costs and needs controls valves and/or devices to provide for predicted and/or unexpected needs while reduce cost of the energy. For example, cost could be in terms of monetary cost and/or carbon footprint and/or include a penalty function for limits in availability and/or not delivering heat at a desired time.

In some embodiments, heat may be recovered using an active (e.g. a heat-pump for induced heat transfer; as opposed to a passive purely diffusive heat exchanger) recovery process. For example, heat may be recovered actively from (i) gray water and/or (ii) sewage water. For example, the waste heat is coupled (e.g. via the heat pump) to an inlet water of a heating system. Generally, system (i) (recovering heat only from gray water) will be sufficient in hot countries while system (ii) (recovering heat from sewage optionally additionally to gray water) is relevant in cold countries. Under certain conditions, this recovery-based solution might be the only water heater in the building. Alternatively or additionally, the heat recovery may be supplemented by an additionally heater.

Additional optional features:
1 two or more walls may separate gray water/sewage from clean drinking water-
2 Reversing the heat pump may be used as an overheating prevention measure for example, for a solar water heating system
3 The system may provide demand-shifting capabilities by storing gray water/sewage in the heat exchanger (e.g. using it as a tank) and only operating heat pump when it's cost-effective.

Additionally or alternatively, an Active Recovery subsystem may contain a dual-purpose additional buffer Tank. For example, the buffer tank may serve to:
1 increased demand shifting capacity: for example, employing a circulation pump through the Gray Water heat exchanger in order to transfer heat (e.g. warm waste water) to a Tank wherein heat will be actively extracted from the stored water at a later more efficient time; and/or
2 re-using of cold-end of the heat pump for building cooling via fan-coils (analogous to "waste heat" we speak here of "waste cold")

In some embodiments, the system may include sensors. For example, sensors may be used to track a user and/or predict his energy usage. For example, the system may track electricity use in a dwelling to determine if anyone is home and/or the system may track particular devices (for example, when a bedroom light and/or a bathroom light is lit in the morning, the system may start sending hot fluid to a dwelling to reduce latency of heat delivery). Alternatively or additionally, the system may receive updates from a location sensor of a user (for example a GPS sensor of a cell phone of an apartment dweller). When the user is far from his apartment, the system may reduce the predicted need and/or reduce the temperature of water in the apartment, for example to reduce heat dissipation. Optionally, the user may be encouraged to give data that will improve predictions. For example, there may be an application on a computing device of the user that allows him to report to the processor of the system when he will be home or not (e.g. when he will use more or less heat) and/or when he will have guests (e.g. requiring additional heat). Optionally a user may get a reward in billing for increased predictability and/or be charged extra if his use is unpredictable.

In some embodiments, incentives may be defined for marginal users who share waste energy. For example, a user who uses very limited hot water and gets little benefit from the system may receive a rebate on his energy bill and/or may be given priority when recovered energy is being redistributed.

In some embodiments, external data may be used to improve predictions of energy availability and/or energy demand. For example, the system's processor may receive updated weather reports over the Internet. The weather reports may be used to predict energy input of a solar thermal system and/or energy dissipation of stored heat to the atmosphere and/or energy use (e.g. people may use more hot water on cold days).

In some embodiments, the processor will balance different sources of heat and/or heat storage with respect to changing needs and costs of energy. For example, if there is a need that is predicted to be greater than the production of renewable energy at a time that energy is expensive, the system may produce and/or store energy ahead of time. For example, energy may be stored in individual hot water tanks of users and/or in shared hot water tanks and/or in other forms of storage (for example underground heat storage and/or cement blocks that can be used to deposit heat and/or retrieve the heat).

In some embodiments, the system will include a central processor and/or a plurality of local processors. For example, the central processor will control general commands and/or objectives and/or coordination between local processors and/or monitoring whether local processors are acting according to instructions and/or monitoring the balance between local level functions of the network. Optionally local processors will control individual valve opening and/or closing and/or receiving data from individual sensors and/or emergency procedures such as local overheating protection. Distribute processing from the central processor to local processors may reduce the need for wiring in a large building. For example, a single local processor may be hard wired to a plurality of simple sensors and/or actuators (e.g. that do not have network communication capacity, but input and/or output simple electrical signals). Thus, the system facilitates centralized control of simple sensors (e.g. thermocouples) and/or actuators (e.g. valves) without requiring hard wiring between the central controller each senor and/or actuator. For example, the central processor will give general instructions (e.g. in accordance with any of the instructions listed in various embodiments herein and/or a schedule of temperatures to maintain in a local tank and/or a schedule of energy demand (e.g. for energy demand up to a threshold use heat from a building shared resources based on renewable and/or recovered heat, for energy use beyond the threshold use a more expensive heat source for example a local heat source. Optionally the threshold may be time dependent (for example the threshold will decrease at times of peak energy demand and/or increase at times of increased energy availability)). Optionally the local controller will collect sensor data and/or control valves without intervention of the central processor until there is a change in policy by the central processor. Optionally, the local processor will periodically send updates (e.g. raw sensor data and/or statistics from sensor data and/or usage data) to the central processor. In some embodiments, the distributed control structure will increase the robustness of the system and/or make the system Tolerance to problems of communications and/or synchronization between zones. In some embodiments, a local user (e.g. a human being who controls and/or owns and/or dwells in an apartment and/or a section of a building) communicates preferences (e.g. a preferred temperature of local hot water over a defined time period, a preferred policy of energy use [e.g. emphasizing cost saving and/or emphasizing heat availability]) to the local controller and/or to the central controller. Optionally, the respective general instructions of the central controller and/or the behavior of the local controller is modified in accordance with the preferences of the local user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
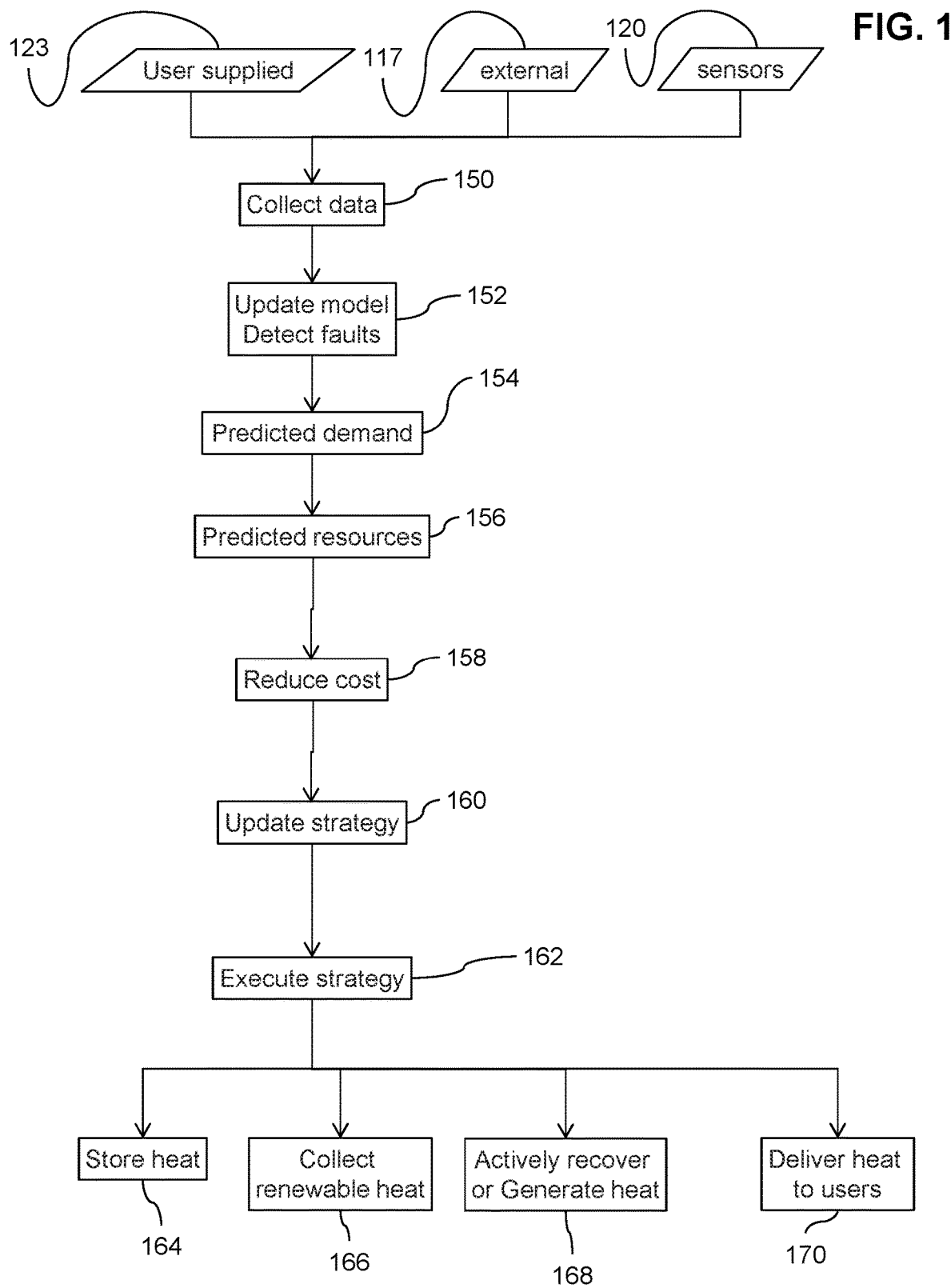
FIG. 1 is a flow chart illustration of a method of integrating shared energy sources with individual energy requirements in accordance with an embodiment of the current invention.

Referring now to the drawings,

FIG. 1 is a flow chart illustration of a method of integrating shared energy sources with individual energy requirements in accordance with an embodiment of the current invention. In some embodiments, a processor receives collects data 150 and predicts an energy need 154 and/or available energy resources 156 at some future time. Optionally, based on the predicted future supply and demand, the processor updates 160 and executes an energy balancing strategy 162. The strategy may include when and how much energy to produce and/or store, which production and/or storage to use at which time, how much energy to distribute at what time and/or to whom, what/or when to communicate to a user to improve usage efficiency and/or effectiveness, and/or what and/or when to communicate a suggestion to fix and/or replace a component of the system. For example, the system may send suggestions to a user that he should take his shower earlier to use heat at a lower cost. For example, the system may suggest to a user that for the demographics of his family he is using a lot of water in the evening (shower time), maybe he should take navy showers and/or replace his shower head. Optionally the system could send suggestions as messages (for example of email and/or short message service (SMS) and/or over a social network and/or using a dedicated app). Optionally, messages may be sent to a system manager suggesting improved policy, suggesting that he speak to a particular user, suggesting that there may be an illegal connection, and/or suggesting an improvement to the system (for example replacing a component of the system with a more efficient component and/or replacing a failing component and/or fixing a failing component).

In some embodiments, predictions of energy availability and/or demand are based on user supplied 123 data, external data 117 and/or sensor data 120. For example, a user may supply 123 data as to when he will or will not be using heat. Alternatively or additionally, the user may set preferences for heat delivery to his apartment and/or to a particular device. For example, a user may specify that he is willing to wait a long latency time to receive hot water rather than pay for heat circulation. For example, when a user leaves a gym from an afternoon workout, he may login to a user application on his telephone and instruct a system processor that he will be taking a hot shower in a half hour when he arrives home. Optionally, the system compares strategies to achieve the desired hot water at the desired time and concludes that his water heater should be heated up now while there is solar energy available so that he will be able to take a shower when he gets home after sundown without needing to heat water electrically. External data 117 may include data about the expected weather (for example the temperature and/or the expected sunlight) and/or information regarding holidays (when people may use different quantities of water than usual). For example, based on the demographic make up of the user population (and/or of individual families) and external data on holidays, vacation behavior and/or school times and/or the time of year, the system may predict that a certain portion of the population will be on vacation and/or adjust expected energy use. In some embodiments, a processor may be connected to sensors (e.g. over a wired connection and/or over a network and/or via wireless signals). Optionally, sensor readings will be used to determine system status, predict future demand and/or predict energy availability. For example, sensors and/or groups of sensors may measure the temperature of storage reservoirs, flow rates in pipe, energy supplied to an apartment, temperature of flowing fluid etc. Alternatively or additionally, an integrated heat supply and distribution system may include sensors that are not directly required for the operation of the system. For example, these sensors may be used to keep track of a location of a resident of a building, when he wakes up, when he enters the bathroom etc. The sensors may include, for example, motion sensors, electricity use sensors, air quality, humidity, insolation sensors, and/or surveillance cameras. Optionally, the sensors may use internal wireless communication capabilities to transmit the collected data to the cloud and/or the central server of the system. The data may be used to plan an energy strategy 160. For example, if energy storage is low before a time of high demand, the system may build up stored energy. For example, stored energy may be built up using active energy generation (for example a heat pump may be used to take in heat from warm waste water leaving the system). Alternatively or additionally, if all of the energy storage is full (e.g. near maximum temperature) early in the day, the system may attempt to lose energy (e.g. arrange an empty reservoir to dump heat for cooling a solar thermal panel if it begins to overheat). For example, a heat pump may be used to discharge heat to waste water and/or heat in storage may be transferred to areas where there is higher dissipation loss).

In some embodiments, past behavior may be used to update 152 a model and/or improve predictions (for example, if a solar thermal system is not working up to specifications, the expected heat supply may be adjusted down). Based on sensor data a processor may identify faults 152 in the system. For example, if water leaving a storage tank is consistently cooler than expected in cold weather the system may flag the tank as suspected of having a fault in its insulation. Optionally, a workman will be sent to fix the insulation and/or the processor will further track whether and/or how much the intervention solved the problem.

In some embodiments, in response to predictions of future demand a processor may seek ways to reduce 158 cost. For example, if the system predicts that demand at a peak time for heat will be greater than the ability of a solar thermal system and/or a waste heat recovery system to fulfill, then the system may store up heat (for example, by using a heat pump to recover heat from wastewater before the peak time). For example the system may expend energy running the heat pump at a time when the entire demand could be filled with solar energy in order to add enough energy storage for the later peak time to avoid paying high rates for electricity at peak time and/or to avoid heating water with inefficient heating elements during the peak time.

In some embodiments, for example based on some or all of the above considerations, the processor updates 160 a strategy for example opening valves and/or activating systems to generate, store and/or dissipate energy and/or limit energy transfer according to a plan. For example, the plan may balance various inputs and/or outputs to achieve a desired outcome. For example the balancing strategy may include storing heat 164 (or dissipating stored heat), collecting 166 renewable heat (for example from a solar thermal collector and/or a heat exchanger in contact with warm waste water), actively generating 168 heat (for example with a heating element and/or a heat pump) (and/or actively dissipating heat e.g. with a heat pump), and/or delivering 170 heat to users (and or limiting delivery of heat to a user). Optionally an active element may be connected to a renewable collector. For example, a heat pump may be used to concentrate energy from solar heated fluid and/or fluid heated from warm waste water.

Figure 2A:
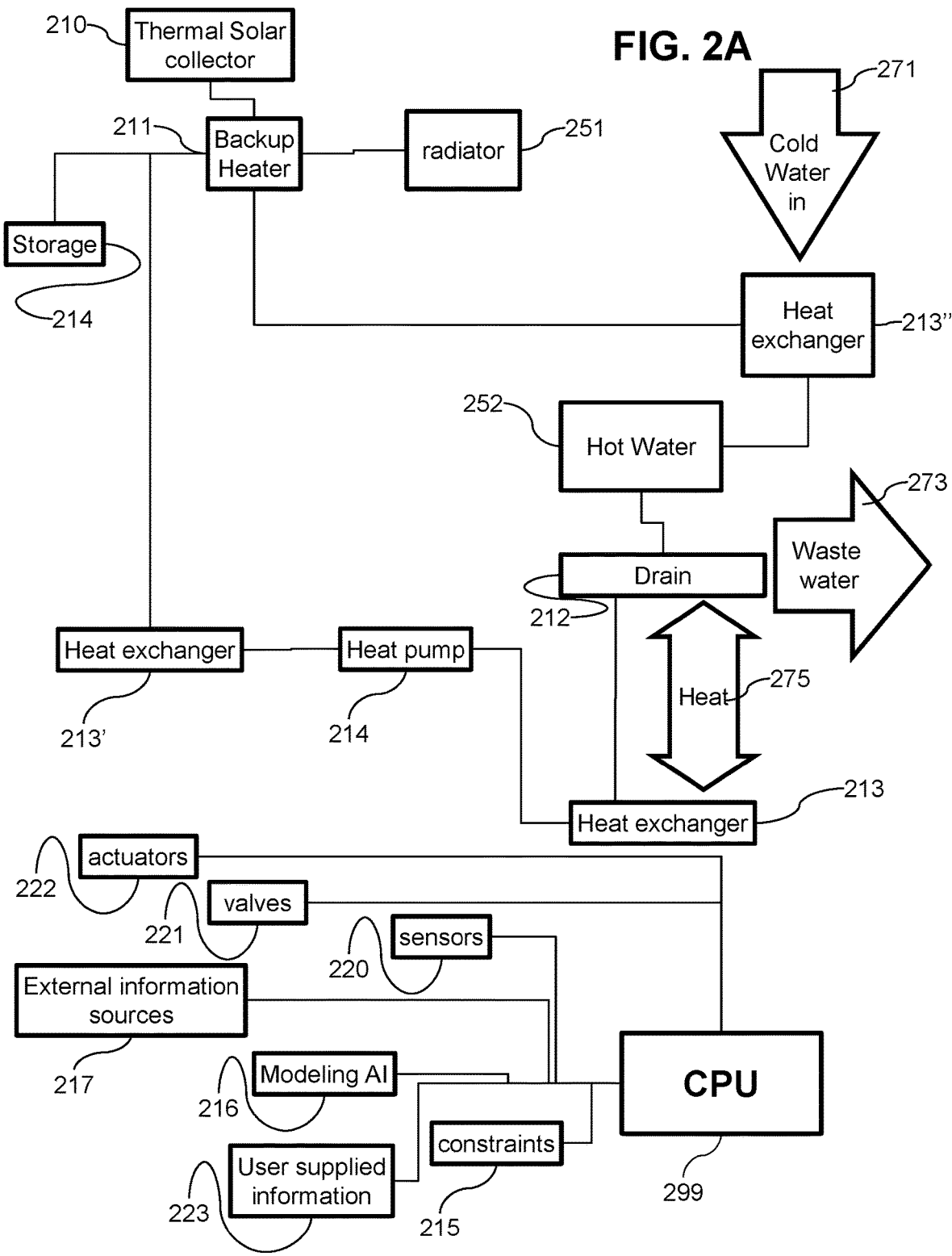
FIG. 2A illustrates a closed loop system in accordance with an embodiment of the current invention.

FIG. 2A illustrates a closed loop system in accordance with an embodiment of the current invention. In some embodiments, a system includes a mix of active, renewable and passive collectors to generate hot fluid (for example a thermal solar collector 210 and/or a traditional heating element 211 (e.g. a gas burner and/or an electric heating element) and/or a pair of heat exchangers 213, 213' (for example for recovering heat from wastewater) and/or a heat pump 214 (e.g. to allow active control of heat recovery)). Optionally heated fluid is recirculated in a closed loop between heat generators and heat users. The heat is optionally taken from the fluid using heat exchangers 213", radiators 251 and/or heat pumps to heat water, air and/or other substances. Optionally a processor 299 controls distribution of fluid (for example by controlling one or more valves 221) and/or generation (or dissipation) of heat (for example by means of one or more actuators 222 and/or by using valves 221 to control flow between generating elements (various positions of valves and sensors in a system are shown for example in FIGS. 4 and 8).

In some embodiments, a processor may receive input from sensors 220. For example, a sensor may report inflow and/or outflows of heat from a user's domain for billing and/or a temperature of a storage reservoir and/or a temperature of flowing liquid and/or flow rate in a pipe and/or a pressure. The processor may optionally receive input from a user interface 223. For example, a user may have an application on a personal computing device that allows he to give instructions to the processor. For example, instructions may relate to management of energy resources in the user's domain (e.g. his apartment). In some embodiments the processor may have a connection to an external network 217 for example to receive pertinent information (e.g. utility rates, weather reports, demographic and/or technical information). Optionally the processor may be programmed with modelling and/or artificial intelligence software 216 and/or constraints 215 to energy use. For example, the programing may be used to improve efficiency of energy use. In some embodiments, when the system has extra network bandwidth, it may make the bandwidth available to third party devices, for example smartphones and/or PC's in a building being served by the system.

In some embodiments sensors 220 may include a microphone and/or another vibration sensing device. Optionally, a vibration measuring device may include an integrated piezo-element (transducer). For example, such transducers may be part of a flow metering device. Optionally, the vibration monitoring device will be out of the audio range. For example, this may avoid picking up data (for example conversations) that could be used for invasion of privacy. Alternatively or additionally, the vibration sensing devices may be used only intermittently for short periods of time and/or filtered and/or of a quality that inhibits improper use of the output. In some embodiments, one or more of the following events or quantities may be detected by a microphone and or a vibration sensor:

1 Valve opening/closing (e.g. manual action by a user, which is not initiated by the System)
2 Feedback for motorized valves operation (e.g. validating they are not stuck or burnt out)
3 Flow detection (binary) or estimation (continuous)
4 Air bubbles in the system: enables air clogging filtering
5 Pump/compressor/fan/etc. degradation/pre-failure: irregular anomalous patterns and/or frequencies
6 Feedback for internal heater and its condition (e.g. on/off feedback, limescale accumulation)
7 Presence of limescale in pipes (e.g. via frequency shift of self-resonance).

In some embodiments, an array of vibration sensors may be used. Localization of events may be by analyzing different signals at different locations. Output of multiple sensors may be used for noise reduction and/or signal filtering. Analysis of data may be performed locally and/or remotely. For example, cloud and Internet resources may be used. In some cases, unidentified noises may be analyzed and/or compared with external databases and/or system history, optionally using tools of artificial intelligence to improve the ability of the system to identify significant events.

In some embodiments, heat may be stored. For example, storage 225 may include individual tanks belonging to users. Optionally, when a user's tank is used for heat storage he may be reimbursed and/or the hot fluid going in and/or out of the user's tank will not be billed. Alternatively or additionally, hot fluid may be stored in a shared tank. Alternatively or additionally, fluid may be used to heat a solid phase heat storage medium (for example a cement block and/or the ground) and then the heat may be recovered for further use. Alternatively or additionally, a phase transition storage reservoir may be used. Optionally, a phase transition reservoir may include a solid which melts to a liquid when heat is added to the reservoir and solidifies when heat is recovered from the reservoir. Optionally state transition storage may facilitate storage of large amounts of energy in a small space at a stable temperature. For example, when there is extra heat it may optionally be used to heat up the storage reservoir. When the system needs heat, the heat is optionally recovered from the storage reservoir. Optionally the system includes a heat pump to extract heat from warm reservoirs and/or transfer it to high temperature circulating fluid.

Figure 4:
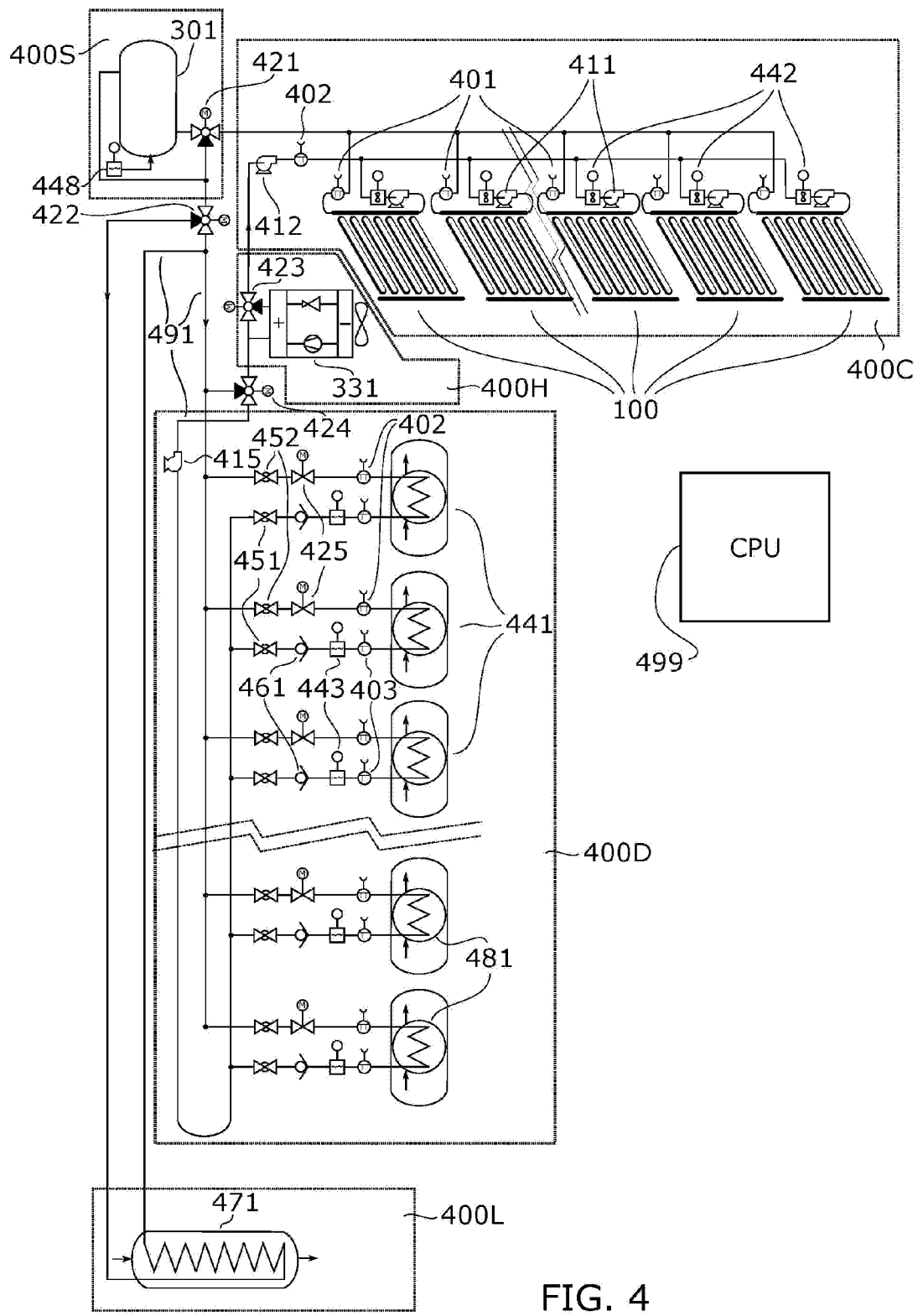
FIG. 4 illustrates a closed loop system with individual water tanks 441 heated by a shared hot water system in accordance with an embodiment of the current invention.
Figure 8:
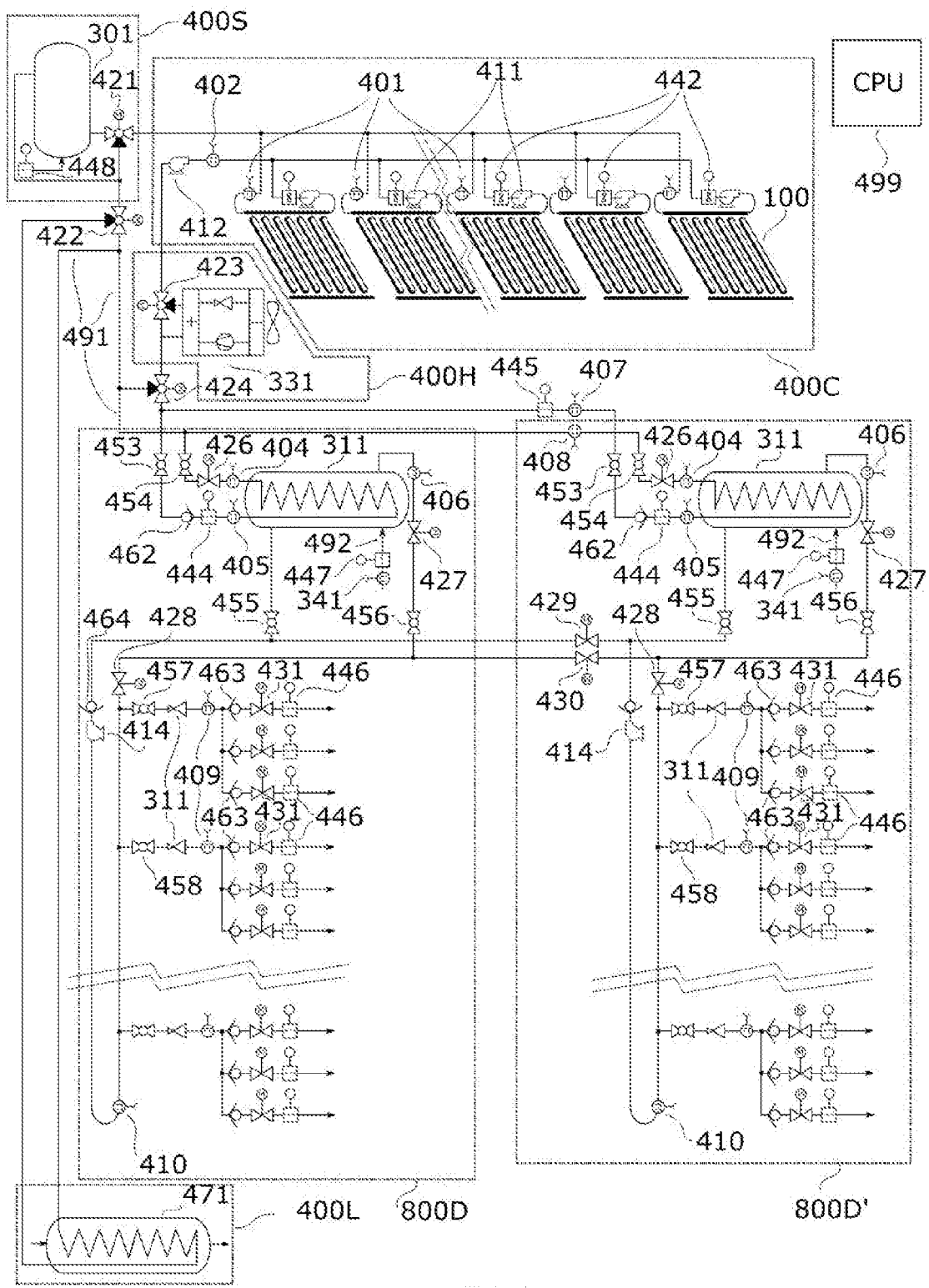
FIG. 8 illustrates an exemplary system with shared water tanks in accordance with an embodiment of the current invention.

In some embodiments, a user employs a radiator 251 to heat space with the hot fluid. Alternatively or additionally, the user may employ a heat exchanger 213" to transfer heat from the hot fluid to cold tap water 271 and/or to produce hot water 252. In some embodiments, the hot water 252 will be produced in a shared tank and sent to individual users (e.g. as illustrated in FIG. 8). Alternatively or additionally, some or all of the individual users may have an individual hot water tank and the heated fluid may be supplied to the users (e.g. as illustrated in FIG. 4). Optionally the hot water 252 is used and then disposed of as warm waste water. In some embodiments a heat exchanger 213 in a drain 212 is used to extract heat 275 from the warm waste water producing useful heat 275 and cold waste water 273 which is disposed of Optionally a heat pump 214 and/or heat exchanger 213' are used to step up heat from a warm heat source and inject it into a high temperature circulating fluid. For example, hot circulating fluid may range in temperature between 50 to 70 degrees Celsius and/or between and/or 70 to 100 degrees Celsius between and/or 100 to 120 degrees Celsius between 120 to 200 degrees Celsius. Optionally warm waste water may range in temperature between 10 to 25 degrees and/or between 25 to 50 degrees.

FIG. 2B illustrates an open loop system in accordance with an embodiment of the current invention. In some embodiments, a balanced system may be used to heat cold input water 271. Optionally the heated water will be supplied directly to a user for direct use.

FIG. 3 is a block diagram illustrating a system for controlling individualized heat supply by a shared system in accordance with an embodiment of the current invention. In some embodiments, one or more individual users 362, 362' may be supplied with heated fluid and/or hot drinking water by a shared system. Alternatively or additionally, there may be a valve for a group of users and/or there may be multiple valves for different devices within a domain of a single user. Optionally, for each user and/or for each device there is a separate valve and/or valve controller 366, 366'. The local valve controller 366, 366' may be programmed with shared routines and/or individual instructions that pertain to a particular user. For example, an individual user may have an individual user interface 362, 362' through which he can program and/or control his own hot water system (e.g. he may turn off a boiler when he doesn't need hot water to save cost and/or program a preferred water temperature). Alternatively or additionally, a user may use his user interface 362, 362' to send information to system controller 370 (e.g. information on future needs for heat so that the system may supply heat more efficiently). Optionally, sensors 364, 364' sense the state of various system components and/or energy use by a user and/or other parameters (for example the presence of a user in his apartment). Optionally, the processor receives data from sensors 364, 364' and/or controls operation of sensors. In some embodiments, a processor may control system component such as valves 366, 366' devices 368 (for example a solar thermal collector and/or a heat pump and/or a heat exchanger and/or a pump and/or various valves). Optionally each device and/or a group of devices may have local controller 368 which controls autonomously some functions of the device. Optionally the behavior of local controller 368 is programmed and/or controlled by the central server 370. In some embodiments the central server is in communication with a network 376 (for example a local network and/or the Internet). Optionally, the network 376 used to receive external data and/or to connect to a user interface 374 of an administrator and/or an individual user interface 362, 362' and/or to connect to one or more of the sensors and/or devices of the system.

In some embodiments, an energy collection and/or distribution system may include further enhancing components, for example to improve efficiency. For example, a solar collector may include solar tracking and/or concentrating hardware. Alternatively or additionally, there may be a removable shade and/or sun-block to protect a solar collector from overheating. Alternatively or additionally, there may be an isolator circuit to improve performance in partial sun. Optionally, central server 370 and/or additionally computer resources will be used to calculate added efficiencies using various enhancement technologies and/or balance costs and/or make recommendations on upgrading a system and/or adding enhancements.

FIG. 4 illustrates a closed loop system with individual water tanks 441 heated by a shared hot water system in accordance with an embodiment of the current invention. In some embodiments, the system includes a plurality of heat exchangers 481 receiving heat (for example in the form of a hot liquid) from a central source and/or heating water in a tank 441 of a private dwelling. For example, a shared source of heat may be used to heat water in water heaters 441 of a plurality of private apartments in a building. In some embodiments, the system includes a plurality of interconnected sensors and/or actuators. For example, there may be a plurality of solar collectors 100 coupled to temperature sensors 401, pumps 411, and/or flow meters 442. Optionally, sensors 401, pumps 411, and/or flow meters 442 may be installed individually and/or grouped in modular arrays. Tubing 491 optionally interconnects various subsystems in parallel, series, vertically and/or horizontally. Optionally, temperature sensors 448, 402 and/or flow sensors 412 are installed individually and/or as part of modular arrays. For example, the number and/or location of sensors 401, 402, 412, 448 is configured to facilitate performance monitoring with desired granularity. In some embodiments, the collectors 100 are connected in series (e.g. a middle collector 100 receiving hot fluid from a previous collector 100, further heating the fluid and sending it to a further collector 100 to achieve high fluid temperatures) alternatively or additionally, all or some of the collectors 100 may be connect in parallel (for example each collector 100 receives return fluid from the system and heats it and send it back). In some embodiments tubing is provided allowing either parallel or series connections between collectors. For example, valves in control of processor 499 may control the degree to which flow is parallel and/or series. For example, processor 499 may use a parallel connection when more throughput is need and/or when the sun is strong and/or when the system does not need very hot water.

In some embodiments, system components are packaged and/or sold as modules. For example, an integrated distribution and collection system may be installed on a new and/or existing building. Optionally modules are designed to be connected to individual apartments and/or existing devices and/or as new devices. The modular design may make it easier to set up and maintain the system.

In some embodiments, a sensor and/or sensor array includes a sensor control unit. For example, the sensor control unit and/or an actuator (e.g. automatic valve, pump, heater, heat pump) is optionally connected to a master control unit 499. Connections are optionally wired and/or wireless. In some embodiments, a sensor and/or a control unit may get power from an external power source. Alternatively or additionally, a sensor, an array and/or a control unit may include an internal power source. For example, power sources may include solar panels, batteries, grid connected power supply and/or others. In some embodiments, a control unit may be configured for autonomous behavior. For example, a control unit may be programmed to ensure safe operation of the attached devices even upon connectivity disruptions.

In some embodiments, a system includes shared short-term heat storage 301 and/or long-term heat storage 471. Additionally or alternatively, heat is stored in individual storages 441. In some embodiments, when there is excess heat producing capacity and/or when power is cheap, heat is stored. Optionally, future needs are projected and/or heat is stored according to projected future needs. Optionally, heat may be redistributed between any of between various forms of storage 301, 471, 441.

In some embodiments, a system includes functional blocks (subsystems). For example, a functional block may include one or more collectors 100, heat storage devices 301, 471, backup heaters 400H, for example including a heat pump 331 and/or a water tank 441. Optionally a functional block may be connected and/or disconnected (bypassed) from circulation by means of adjusting a switching valve and/or a blocking valve. For example, short-term storage 301 may be connected and/or bypassed using valve 421, long-term storage 471 may be connected and/or bypassed using valve 422, heat pump 331 may be connected and/or bypassed using valve 423, optionally a group of individual storages 441 (for example all individual storages 441) may be disconnected and/or connected via valve 424. (in some embodiments heat may be stored in the distribution system (typically for less than 6 hours) and/or in short term storage (typically less than three days) and/or in medium term storage (typically for less than a month) and/or long term storage for as long as a year or possibly more) The system optionally includes valves 451, 452 or 425 and one-way valves 461 positioned to connect and/or disconnect one or more individual storage 441 tanks.

In some embodiments, the entire system is controlled by central controller 499. For example, each valve is controlled by a central controller 499. Optionally, some devices and/or sub-systems may be semi-autonomous. For example, a zone and/or a part of a zone and/or a few zones may be controlled by a local controller. For example, the central controller 499 may give a generally instruction local controller while the exact times and rates of flow in accordance with the general instructions may be decided autonomously by the local controller based for example on sensor readings. Optionally, valves and/or other actuators may be interconnected and/or share control units with sensors and/or may be installed and/or controlled as separate units. For example, there may be device level control (e.g. a local controller may control one or a few devices and/or one or a few sensors), system level control (e.g. CPU 499 may control all of the devices and/or sensors in a building), remote control (e.g. certain function of the system may be controlled over a network e.g. the Internet). For example, a local controller may query sensors and/or handle routine activity and/or include short-term procedures emergency procedures which will proceed automatically if a device is cut off from the server 499 and/or the network (for example pumping cold water into a collector if it overheats to a critical temperature). In some embodiments, a central server 499 (e.g. on a scale a building and/or a few buildings) will perform large scale planning for example balancing energy consumption, storage, dissipation and/or improving efficiency for example by balancing extra cost of energy at peak times against losses of dissipation of stored heat and/or possible inefficiencies caused by over and/or underprediction of need and/or production and/or reducing grid load (e.g. reducing use of electric power at peak times) and/or reducing cost and/or other user defined cost functions. In some embodiments, the local server 499 performs multivariate optimization and planning based on the current models of hardware, weather forecast, user profiles, a day of a week, holiday/non-holiday and custom user preferences or requests (e.g. guests expected). The local server optionally reports collected data to the cloud and/or makes sure the data is contiguous even under unreliable networking conditions. In some embodiments, user options are derived from user's payment/service level plans and/or custom events set by the user. For example, the user may set events on a dedicated website and/or via an app (e.g. a dedicated app and/or a Calendar app (e.g. Siri, Alexa, whatever). User profiles are generally based on history, but also on other users with similar usage profiles.

In some embodiments, the amount of energy used and/or returned to the system by a given portion of the system (e.g. a private apartment), device and/or sub-portion is measured. For example, measurement of energy use may be performed using pair of thermosensors 402 and 403 with flow meter 443. For example, the energy used may be calculated from the flow rate, time and the temperature change between inflow and outflow. Knowledge of energy may be used to enforce quotas and/or enable energy exchange between individual tanks and/or for billing. Optionally a user may pay for extra heat use and/or be reimbursed for energy returned to the system. In some embodiments, circulation may be forced using a pump 415 and/or valves 425.

In some embodiments, the system may be configured for detecting leakages. For example, the system may compare overall flows in and out of a subsystem or the whole system. Optionally inflow may be compared to outflow. Alternatively or additionally, leakage may be detected by selectively disabling a subsystem and measuring changes in pressure. Optionally, the leak may be localized by cutting off individual sections and measuring leakage until the location of a leak is found. Leaking subsystems may be disabled while the rest of the system continues functioning and/or a control center alert might be created depending on policy.

In some embodiments, the system may be composed of logical units. For example, there may be a collected subsystem 400C, distribution subsystem 400D, short-term heat storage 400S, long-term heat storage 400L and/or backup heater 400H. Each subsystem may be horizontally scaled and/or vertically scaled. For example, subsystem 400D may be vertically scaled.

For explanatory and definition purposes only, we introduce the terms horizontal, vertical and mixed scaling and gateways. Herein composition may be used as a term of organization individual systems that may act as a whole with respect to efficient use of shared or individual resources to achieve shared or individual objectives. We regard these systems as subsystems of a merged system. Terms horizontal and vertical are not necessarily used in their geometrical meaning but may hint to this meaning. Terms "upper" and "lower" do not necessarily mean respective location in this context.

The term "gateway" refers to connect merged subsystems and/or facilitate their inter-operability. A gateway may include hardware and/or software.

Figure 5:
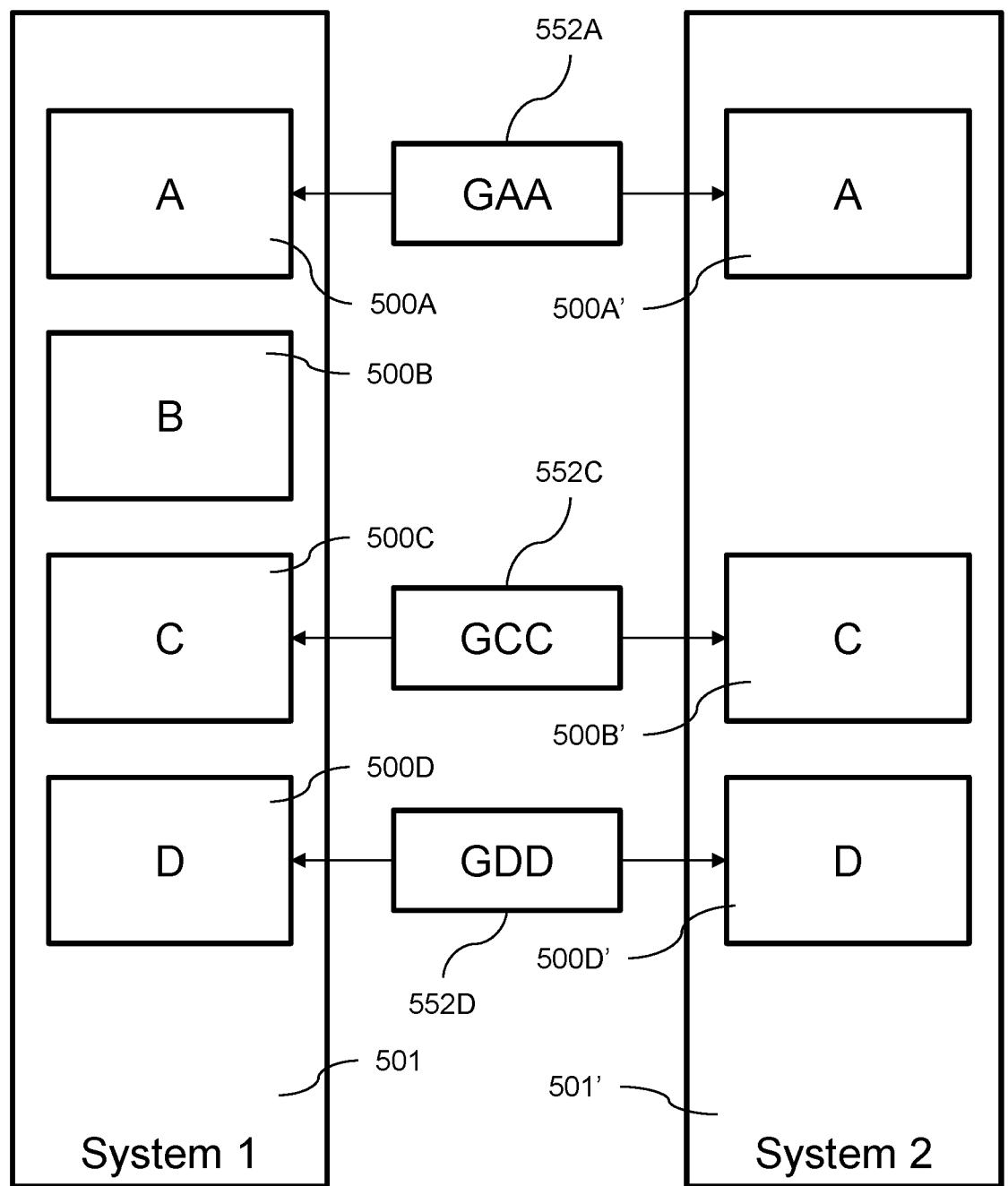
FIG. 5 illustrates an exemplary horizontal composition of a system in accordance with an embodiment of the current invention.

FIG. 5 illustrates an exemplary horizontal composition of a system. Optionally, functional blocks 500A, 500A', 500C, 500C', 500D, 500D' of the merged subsystems 501, 501' interface at the same levels (e.g. blocks 500A and 500A' via gateway 552A, blocks 500C and 500C' via gateway 552C, blocks 500D and 500D' via gateway 552D, (some levels can be skipped e.g. block 500B).

Figure 6:
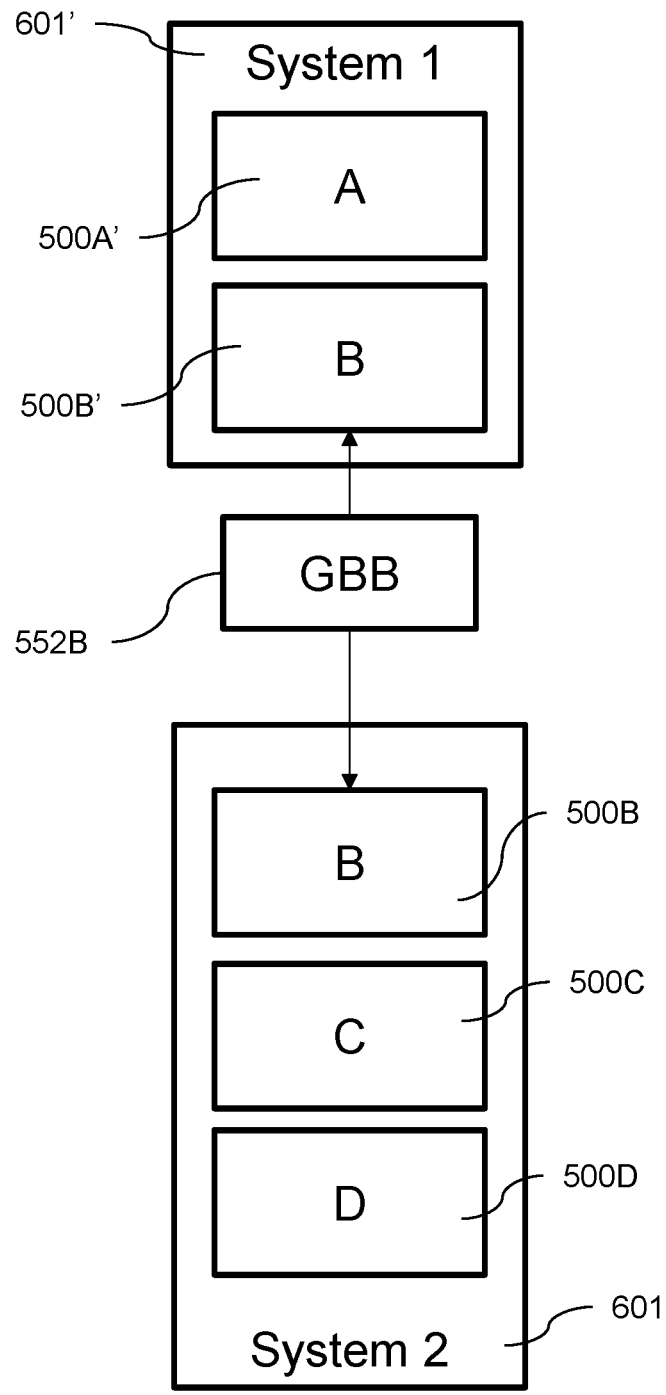
FIG. 6 illustrates an exemplary vertical composition of a system in accordance with an embodiment of the current invention.

FIG. 6 illustrates an exemplary vertical composition of a system. Optionally Functional blocks 500B and 500B' of the merged subsystems 601, 601' interface to the same or different levels of the peer subsystems 500B and 500B'. For example, the systems 601, 601' have a single gateway 552B connecting a top-level block 500B of subsystem 601 to a bottom level block 500B' of subsystem 601'. In some embodiments, in a vertical combination a subsystem will have two gateways: to its "upper" and "lower" levels. Other configurations are possible.

Figure 7:
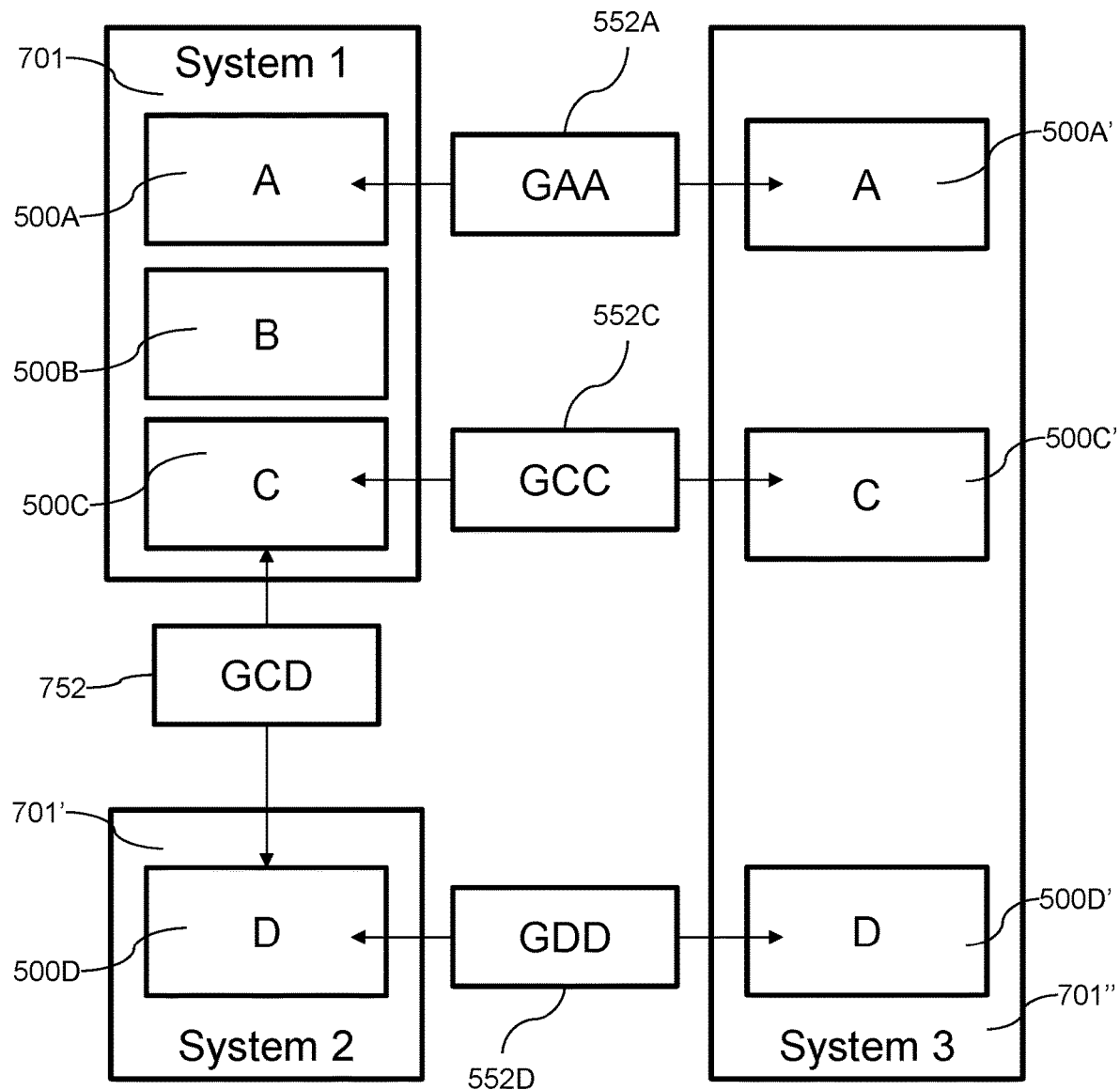
FIG. 7 illustrates an exemplary mixed composition of a system in accordance with an embodiment of the current invention.

FIG. 7 illustrates an exemplary mixed composition system. The system can be viewed as a set of successive horizontal and/or vertical compositions of the respective subsystems 701, 701' and 701". For example, a vertical combination of subsystems 701 and 701' is combined by a gateway 752. The vertical combination is further combined horizontally with subsystem 701".

FIG. 8 illustrates an exemplary system with shared water tanks. Cold water enters shared tanks 311 via inlet 492 and is heated using heat exchangers 881. Heat exchangers receive hot fluid from the same collector subsystem 400C, short- and long-term storage subsystems 400S and 400L, and/or backup heater subsystem 400H as in the system of FIG. 4. Optionally, the hot water distribution subsystem in the embodiment of FIG. 8 includes two horizontally scaled subsystems 800D and 800D'. Optionally the heat use is monitored and/or controlled for example using temperature sensors 404-408 and/or flow meters 444, 445, 448 and/or valves 426-430, 453, 454, 458 and/or one-way valves 462, 464, In some embodiments, heated water from tanks 311 is delivered on demand to private users. For example, the hot water passes through valves 455, 457 and/or pressure reducers 312. Optionally, outlet temperature sensors 409 together with inlet temperature sensors 341 and flow meters 446 define the amount of energy used by an individual. Optionally, one-way valves 463 prevent reverse flow and valves 431 are used to enforce quotas.

In some embodiments, pumps 414 are used to create forced circulation that can be used, for example, for water preheating for reduced hot water waiting time. Temperature sensors 410 are optionally used to determine the temperature in different parts of the system. Based on the temperature distribution in the system, predicted demand and/or predicted supply of heat a local controller and/or a centralized controller 499 decides when pump 414 is turned on or off and/or when a valve (e.g. 457, 458, 431) is opened or closed controlling local circulation in various parts of the system.

In some embodiments the system performs leakage detections and quota management. For example, additional checks can be done using flowmeter 447. Circulation pumps may optionally be used to create additional pressure during leakage check.

FIG. 9 extends a heat distribution system in accordance with an embodiment of the current invention. In some embodiments, the system of FIG. 4 may be naturally extended by increasing the number of water tanks 441. Alternatively or additionally, for example as illustrated in FIG. 9 the system may be extended by increasing number of subsystems 400D, 400D' and/or further distribution subsystems. Optionally, a heat exchange subsystem 900E is include. For example, subsystem 900E allows the distribution exchange of energy between distribution subsystems 400D and/or 400D' on demand. Alternatively or additionally, hot water storage and distribution subsystems 400D, 400D' can be coupled by each other by means of heat exchanger integration with either disjoint hot transfer fluid circulation or can share fluid with appropriate pressure and flow adaptation.

In some embodiments, subsystems 400D and/or 400D' may be coupled by skip-level heat exchangers. For example, coupling may be between non-neighboring subsystem.

FIG. 10 is a graph of energy balance over time on a sunny day in accordance with an embodiment of the current invention. For example, the graph is shown at a current time 1088 of 10:00. Exemplary, measured production 1011 (e.g. active production using a heat pump and/or a heating element), collection 1010 (e.g. using solar thermal collectors), consumption 1025 and storage 1012 are shown as solid lines with symbols. Exemplary predicted production 1011', collection 1010', consumption 1025'; and storage 1012'; are shown as solid lines with symbols. Production 1011, 1011' collection 1010, 1010' and consumption 1012, 1012' are illustrated in terms of power (kW, left axis). Storage 1025, 1025' is illustrated in terms of energy (kWh, right axis). Optionally, the system balances storage 1025, 1025' and collection 1010, 1010' to save money on production 1011, 1011'. For example, at peak consumption 1012 (e.g. 8:00) energy is drained from storage 1025 and used to fill consumption 1012 needs which are not supplied by collection 1010. At times of peak collection 1010' (e.g. 12:30) excess collected 1010' energy is put into storage 1025' for use later.

FIG. 11 is a graph of energy balance over time on a cloudy day in accordance with an embodiment of the current invention. For example, the graph is shown at a current time 1188 of 10:00. Exemplary, measured production 1111 (e.g. active production using a heat pump and/or a heating element), collection 1110 (e.g. using solar thermal collectors), consumption 1112 and storage 1125 are shown as solid lines with symbols. Exemplary predicted production 1111', collection 1110', consumption 1112'; and storage 1125'; are shown as solid lines with symbols. Production 1111, 1111' collection 1110, 1110' and consumption 1012, 1012' are illustrated in terms of power (kW, left axis) storage 1125, 1125' is illustrated in terms of energy (kWh, right axis). Optionally, the system balances production 1111, 1111' storage 1125, 1125' and collection 1110, 1110' to save money. For example, production 1111, 1111' is scheduled at times of lowered energy costs. For example, at 4:30 previous to peak consumption 1112 (e.g. at 8:00) energy produced 1111 and stored 1125. The stored 1125 energy and used to fill consumption 1112 needs at peak demand (e.g. at 8:00) which are not supplied by collection 1110. At times of peak collection 1110' (e.g. 12:30) excess collected 1110' energy is put into storage 1125' for use later.

FIG. 12 is a block diagram of a system having a computerized collection 1200C and/or distribution 1200D system in accordance with an embodiment of the current invention. The system optionally may include other subsystems such as storage and/or production. Optionally a processor 499 tracks energy use, production and/or availability and/or manages a distribution 1200D sub-system. For example, the processor 499 may keep track of the performance of system components (e.g. collectors 1200C and/or distribution 1200D). For example, the processor 499 may be configured to identify opportunities to improve efficiency and/or heat delivery. For example, the processor may identify inefficient use of energy and/or notify a user and/or an administrator. Optionally, the processor and/or the administrator will identify ways to improve efficiency (for example changing the time and/or way in which energy is used). For example, the processor may identify malfunctioning equipment and/or notify a user and/or an administrator. Optionally, the system may track performance of a large number of components over many buildings. Optionally, the system compiles statistics and use them to make recommendations about equipment purchases and/or repairs. Optionally, the system compiles use statistics and/or recommends equipment (e.g. brands and/or models) which will fulfill needs efficiently. Sensors, hardware, software and/or network resources may be used to improve measurement of system performance, prediction of future needs and/or recommendations of strategies and/or improvements.

For large buildings with multiple entrances, it's a common practice to build independent systems for each entrance. The configuration below describes semi-independent systems which can share energy between each other.

The systems can be connected to each other at subsystem at various levels while some subsystems can be shared.

FIG. 13 illustrates an exemplary system with active heat recovery in accordance with an embodiment of the current invention. Optionally the system of FIG. 13 is generally similar to other embodiments herein, for example, the system illustrated in FIG. 8 with addition of a heat exchanger 1313 (and/or an array of heat exchangers), for example for harvesting heat from waste fluid (e.g. sewage and/or gray water). Additionally or alternatively, a heat pump 1331 is connected to the heat exchanger 1313. For example, warm waste water is drained from a building on a drainage tube 1312. The drainage tube 1312 leads to a first channel of heat exchanger 1313. Heat transfer fluid (e.g. freon and/or fluid that is passed to heat the freon of the cold cycle of the heat pump 1331) is passed through a second channel of the heat exchanger 1313. For example, cold fluid from the expanding cycle of the heat pump 1331 is warmed by the waste water. The warmed fluid is then compressed to produce heat that is transferred to fluid to the heating system of the building and/or to a water heating system. The cooled waste water is optionally drained through an outlet drain 1373 to a sewage system. In some embodiments, the system may be reversed for example, when a portion of the building (for example a solar heating system) is overheating, heating fluid from the overheated system may be cooled by cooled fluid from the heat pump 1331 and/or then the waste heat may be transferred to waste water using the heat exchanger 1314. Optionally, the heated waste water and the waste heat are drained through drainage line 1373 to a sewer system. Alternatively or additionally, there may be an added heat exchanger. For example, waste water heats up another fluid (e.g. clean water and/or water with antifreeze and/or anticorrosion additive) and/or the other fluid heats up the cold cycle of the heat pump. Generally, in some embodiments, waste heat and/or warm waste water is fed into an input of an array of one or more heat exchangers and/or heated fluid from the array is used to warm a cold channel of a heat pump.

In some embodiments, the heat exchanger 1313 and/or other parts of the recovery system may be installed on a lower floor and/or in a basement of a building. Alternatively or additionally, a pump 1314 may be supplied for pumping heat transfer fluid and/or waste water to and/or from the heat exchanger 1313. Optionally, heat storage may be included in the system, for example for load shifting. For example, a tank may be used to store warm waste water facilitating active heat transfer at times when energy for the heat pump 1313 is economical. Alternatively or additionally, other heat storage facilities may be supplied (for example long term storage 400L and/or short terms storage 400S).

In some embodiments, a system for recuperating heat may improve the overall performance of an underlying primary heat generation system. Embodiments of the recuperation system may be integrated in the most types of centralized heating systems. Alternatively or additionally, the heat recuperation system may serve as a backup heater. Alternatively or additionally, the heat recuperation system may serve as a stand alone heating system. For example, the recuperation system may be the only heat provider without a need in an additional heat supply.

In some embodiments, the system will employ a heat pump for driving the recuperation process and/or controlling it. Optionally, a machine learning based prediction system will be used to control the heat pump. For example, the system may be turned on when the combination of CoP (coefficient of performance) of the installed heat pump and current electricity tariff is economically justified. Additionally or alternatively, the system may finally release the drainage water at temperatures lower than inlet water, when extra energy is required.

In some embodiments, a heat recuperation system may be coupled to a solar thermal system. For example, the heat pump may produce higher temperature water when the solar thermal system is not producing a desired temperature. Alternatively or additionally, the heat pump may be used for overheating prevention, for example, the heat pump may be reversed, cooling overheated water from the solar thermal system and/or transferring excess heat a waste water flow.

In some embodiments, a method is supplied to refurbish and/or retrofit a conventional heating system to include heat recuperation and/or active heat recuperation. For example, some components currently used in many centralized system designs, such as individual water tanks will be used and/or replaced in the retrofit system. This may facilitate a lower overall system cost for a significantly more efficient system. For example, a conventional centralized system may be retrofit with thermal insulation of the grey water drainage systems. This may raise the overall efficiency of the recuperation process.

In cold countries, where inlet water is significantly colder than in-building temperature, recuperating heat from sewage is feasible, since in many cases it has the temperature of the building. In some embodiments, a single heat recuperation system will be used for gray water, solar heated water and/or sewage water, for example adding an additional heat exchanger suitable for sewage. For example, this may, give a potential of additional 40-60% energy savings at 15-20% increase in cost. This configuration may be used for the sole system in a multifloored building and/or complementary source of energy.

In some embodiments, system performance is constantly monitored for anomalies. Monitoring may facilitate automated actions when degradation in performance is detected. For example, automatic actions may ameliorate problems such as with heat exchangers or a leak in the system.

In some embodiments, the recuperation system can be used for retro-fitting existing central water heating systems. For example, retrofitting may revive performance, reducing pollution and/or help match government regulations that become stricter with time.

In some embodiments, a recuperation system may be paired with an under-powered solar thermal heating system. The solar thermal system is optionally based on insulated collectors (e.g. vacuum tube based collectors). This combination has extremely good cost saving potential, since the collectors may be kept working at nearly 100% (e.g. between 20 to 50% and/or between 50-70% and/or between 85 to 95% and/or between 95 to 100%) power all year round, while allowing the recuperation system to only work when the estimated CoP is high (e.g. at least 8 and/or at least 9 and/or at least 6 and/or at least 4. Such high efficiencies may be impractical in air-water heat pumps in most places). In such setup, the recuperation system may be used as a pre-heater for the inlet water to the solar collectors.

In some embodiments, grey water pipes are not directly coupled to the inlet water. This may facilitate meeting Ministry of Health requirements.

FIG. 14 illustrates and exemplary system in accordance with an embodiment of the current invention. For example, the system of FIG. 14 may be used as a laboratory to test performance of the system under different conditions and/or to test various strategies to achieve improved system performance. Features of the embodiment of FIG. 14 may be incorporated into other embodiments of the invention. In some embodiments a heat exchanger 1313 accepts two input liquid flows 1412a, 1412c which exit as flows 1412b and 1412d respectively and/or passively transfers heat from the hotter of the input liquid flows (e.g. 1412c) to the cooler of the liquid output flows (e.g. 1412b). The upward direction is illustrated by arrow 1491. Optionally, tanks (e.g. 1400S and/or 1441) are set up with cold water entering at the bottom and/or hot water exiting at the top. Optionally a tank 1441 may include an overflow exit 1473.

In some systems, for example the experimental system of FIG. 14, there may be a valve that facilitates mixing between the two flows to the heat exchanges. Alternatively or additionally, the two flows may be kept separate. For example, in a commercial system the two flows may be hermetically sealed apart and/or separated by one or more walls. For example, freon from a heat pump 1331 and/or water from a radiator 1383 and/or clean water being preheated before use in a shower and/or heating fluid being preheated (for example before being sent to a solar water heater) may be directly feed through one stream of the heat exchanger 1331.

In some embodiments, the system of FIG. 14 is configured for flexibility in simulating many different scenarios. Optionally there may be an array of heat exchangers. For example, there may be a second heat exchanger, for example it is possible to in one stream of the heat exchanger 1313 there may be (or simulate) flow of waste water while in the other flow there may be a flow of heating fluid. The heating fluid may be used to heat a cold cycle of a heat pump (e.g. entering flow 1412e is cooled and exits as flow 14120 and/or a heat harvesting system may use the heat pump may heat drinking or bathing water or water that goes to radiator 1483 etc. (for example cool water may enter as flow 1412g get heated and exit as flow 1412h). Optionally, a tank 1400S may include a removable top cover 1493.

In some embodiments, an active heat recovery system may include a heat exchanger 1313, a heat pump 1331, heat and/or fluid storage locations 1400S. Optionally, the system includes a hot water tank 1441, a cold water inlet 1485, a drainage outlet 1473 and/or a heat sink 1483 (e.g. a radiator). Optionally, the system allows water. In the system a number (e.g. 5) of valves 1402 facilitate redirecting fluid through various circuits and devices to simulate various modes of use of an active and/or passive heat recuperation system. A number (for example 8) of heat sensors 1405 facilitate tracking the temperature of fluid at various parts of the system. A number (e.g. 3) of flow sensors 1404 help track the flow rates and/or pressures in the system.

In some embodiments, storage location 1441 may simulate a water heater tank. For example, warm water may be fed through flow 1412b to heat fluid flowing through flow 1412a which is used to heat cooled fluid of heat pump 1331. The heated fluid is used by the heat pump to warm cooling fluid that has expanded. The warm cooling fluid is then compressed and/or heated. The heated cooling fluid is optionally used to heat fluid that is sent to a water heater 1441 and/or a radiator heat sink 1483. Optionally, storage 1400S may be used for demand shifting. For example, instead of using the heat pump immediately, waste water and/or clean water heated in the heat exchanger 1313 by the warm (simulated) waste water is stored in storage 1400S until a time was electricity is cheap and/or heat can be extracted more economically. Then the stored hot water is sent down flow 1412b to heat fluid in flow 1412a which is used to heat air conditioning fluid in the cool cycle of heat pump 1331.

It is expected that during the life of a patent maturing from this application many relevant energy generating and distributing technologies will be developed and the scope of the terms heat generating, heat exchanging, heat pump, valve, sensor are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the rib(s) includes one or more rib). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. In addition, for the purposes of the present disclosure, directional or positional terms such as "top", "bottom", "upper," "lower," "side," "front," "frontal," "forward," "rear," "rearward," "back," "trailing," "above," "below," "left," "right," "horizontal," "vertical," "upward," "downward," "outer," "inner," "exterior," "interior," "intermediate," etc., are merely used for convenience in describing the various embodiments of the present disclosure.

The term "coupled", including its various forms such as "operably coupled", "coupling" or "coupleable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection. This term may also refer to other system component which can serve functionality of the system.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A heat sharing system comprising:
   a renewable heat collector heating a fluid including at least one of drinking water and bathing water;
   a plurality of usage zones;
   a reservoir for said fluid;
   a plurality of remote-controlled valves allowing individual control of flow between said reservoir and each said zone and said collector;
   a processor controlling said plurality of valves; and
   a heat pump collecting heat from waste water under control of said processor and supplying heat to said fluid;
   wherein said heat pump is further configured for transferring heat from said fluid to said waste water.

2. The system of claim 1, further comprising:
   a plurality of local sensors;
   a plurality of local controllers, each of said plurality of local controllers controlling at least two respective valves of said plurality of remote controlled valves based on data from a plurality of respective sensors of said plurality of local sensors and, wherein each of said local controllers is in communication with said processor, and
   wherein said plurality of local controllers provide decentralized control of local policy coupled to centralized control of shared resources and allow continued operation in case of processor operation failure
   wherein said controller controls said plurality of valve via controlling said plurality of local controllers and wherein each of said plurality of local controllers controls said at least two respective valves according to a time dependent goal function received from said processor.

3. The system of claim 1, wherein said processor is configured to deliver fluid at a first temperature during one time period and at a different temperature at a different time period.

4. The system of claim 1, wherein said processor is configured for predicting future usage and future available energy resources.

5. The system of claim 4, wherein said processor is configured to change a quantity of heat stored in said reservoir in response to a predicted need.

6. The system of claim 4, further including a user interface and wherein said user interface is configured to supply data to said processor to improve a prediction of future use.

7. The system of claim 4, wherein said processor is connected to an external data source for automatic updating of information for said predicting.

8. The system of claim 7, wherein said information includes a weather prediction.

9. The system of claim 7, wherein said information includes scheduling data from a personal computing device of a user of the heat sharing system.

10. The system of claim 1, further comprising a vibration sensor configured to detect at least one of opening a valve, closing a valve, air bubble in a pipe, problems in a pump, problems in a compressor and presence of limescale.

11. The system of claim 1, wherein said renewable heat collector includes a solar thermal collector.

12. The system of claim 1, further comprising:
    a heat flow sensor positioned to measure heat flow between said reservoir and at least one of said zones.

13. The system of claim 1, wherein the system is configured for horizontal supplying heat from a first of said zones to a second of said zones and wherein a user associated with said second of said zones is billed for said heat supplied thereto and a user associated with said second of said zones is credited for said heat.

14. The system of claim 1, further comprising a heat storage separate from said fluid and wherein said heat pump is configured to transfer heat from said fluid to said heat storage.

15. The system of claim 14, wherein said heat storage includes a tank storing said waste water.

16. The system of claim 14, wherein said transfer of heat is to prevent overheating of said renewable heat collector.

17. The system of claim 1, wherein said processor collects data from a plurality of buildings and a plurality of said usage zones and compiles statistics and recommends a way to improve system performance.

18. The system of claim 17, wherein said way to improve system improve system performance includes a sensor to improve measurement of system performance.

19. The system of claim 1, wherein said processor is configured for simulating different scenarios.

* * * * *